United States Patent
Uemura et al.

(10) Patent No.: US 8,676,204 B2
(45) Date of Patent: Mar. 18, 2014

(54) MOBILE COMMUNICATION SYSTEM, BASE STATION DEVICE, MOBILE STATION DEVICE AND MOBILE COMMUNICATION METHOD

(75) Inventors: Katsunari Uemura, Osaka (JP); Hidekazu Tsuboi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 175 days.

(21) Appl. No.: 12/922,826

(22) PCT Filed: Mar. 10, 2009

(86) PCT No.: PCT/JP2009/054511
§ 371 (c)(1),
(2), (4) Date: Sep. 15, 2010

(87) PCT Pub. No.: WO2009/116427
PCT Pub. Date: Sep. 24, 2009

(65) Prior Publication Data
US 2011/0009095 A1 Jan. 13, 2011

(30) Foreign Application Priority Data
Mar. 19, 2008 (JP) .................................. 2008-072494

(51) Int. Cl.
*H04W 36/00* (2009.01)
*H04W 4/00* (2009.01)

(52) U.S. Cl.
USPC ........... 455/436; 455/437; 455/438; 455/440; 455/443; 455/432.1; 370/331

(58) Field of Classification Search
USPC ................ 455/411, 432.1, 436–444; 370/331
See application file for complete search history.

(56) References Cited

U.S. PATENT DOCUMENTS

2004/0259546 A1* 12/2004 Balachandran et al. ... 455/435.2
2011/0117916 A1* 5/2011 Dahlen ......................... 455/436

FOREIGN PATENT DOCUMENTS

| EP | 1718093 A1 | 11/2006 |
| EP | 2180736 A1 | 4/2010 |

(Continued)

OTHER PUBLICATIONS

ETSI MCC: "Draft Report of 3GPP TSG RAN WG2 Meeting #61, Sorrento, Italy, Feb. 11-15, 2008", 3GPP Draft; R2-081401 Draft Report RAN2 61 Sorrento, 3rd Generation Partnership Project (3GPP), Mobile Competence Centre; 650, Route Des Lucioles; F-06921 Sophia-Antipolis Cedex; France. vol. RAN WG2, no. Shenzhen, China; 20080331, Feb. 15, 2008, XP050139136, [retrieved on Mar. 31, 2008] pp. 69 and 70.

(Continued)

*Primary Examiner* — Olumide T Ajibade Akonai
*Assistant Examiner* — Dung Hong
(74) *Attorney, Agent, or Firm* — Birch, Stewart, Kolasch & Birch, LLP

(57) ABSTRACT

A mobile station device that communicates with a base station device, the mobile station device including: a determination unit which determines whether to request the base station device to provide control information of a small base station device accessed by the mobile station device or not; a first transmission unit, when the determination unit determines that the control information is to be requested, which sets information of the small base station device in a control information request message and transmits the control information request message to the base station device; a first reception unit which receives a response message transmitted from the base station device; and a measurement control execution unit which executes measurement control according to control information set in the response message received by the first reception unit.

6 Claims, 30 Drawing Sheets

(56) References Cited

FOREIGN PATENT DOCUMENTS

| EP | 2180756 A1 | 4/2010 |
|---|---|---|
| EP | 2187665 A1 | 5/2010 |
| JP | 2003-509982 A | 3/2003 |
| JP | 2006-311558 A | 11/2006 |
| JP | 2007-150860 A | 6/2007 |
| JP | 2009-49485 A | 3/2009 |
| JP | 2009-49661 A | 3/2009 |
| JP | 2009-77368 A | 4/2009 |
| JP | 2009-111624 A | 5/2009 |
| JP | 2009-124671 A | 6/2009 |
| JP | 2009-141945 A | 6/2009 |
| JP | 2009-207108 A | 9/2009 |
| WO | WO 01/20942 A1 | 3/2001 |

OTHER PUBLICATIONS

European Search Report issued in European Patent Applicacation No. 09723192.2 on Jul. 5, 2012.

Panasonic: "CSG cell handover", 3GPP TSG RAN WG2 #61, Feb. 15, 2008, pp. 1-4, XP002678618, R2-080884.

3GPP TS 36.300, 3rd Generation Partnership Project: Technical Specification Group Radio Access Network; Evolved Universal Terrestrial Radio Access (E-UTRA) and Evolved Universal Terrestrial Radio Access Network (E-UTRAN); Overall Description; Stage 2, Ver. 8.3.0, Dec. 2007.

Huawei, "Cell Re-Selection for hNB", R2-074831, 3GPP TSG-RAN WG2 Meeting #60, Nov. 5-9, 2007, Jeju, South Korea.

International Search Report for Application No. PCT/JP2009/054511, dated Apr. 28, 2009.

Motorola, "Identification and Measurement of CSG Cells", R2-081114, 3GPP TSG RAN WG2 #61, Feb. 11-15, 2008, Sorrento, Italy.

T-Mobile et al., "Text Proposal for CSG Related Mobility", R2-075453, 3GPP TSG-RAN WG2 Meeting #60, Nov. 5-9, 2007, Jeju, South Korea.

* cited by examiner

FIG. 11A

| 1 | CELL ID_A |
| | FREQUENCY INFORMATION_A |
| | GLOBAL ID_A |
| | ... |
| 2 | CELL ID_B |
| | FREQUENCY INFORMATION_B |
| | ... |
| ... | ... |

FIG. 11B

| 1 | CELL ID_A |
| | QUALITY INFORMATION_A |
| 2 | CELL ID_B |
| | QUALITY INFORMATION_B |
| 3 | CELL ID_C |
| | QUALITY INFORMATION_C |
| ... | ... |
| 1 | CELL ID_D |
| | FREQUENCY INFORMATION_D |
| | GPS INFORMATION_D |
| | ... |
| ... | ... |

FIG. 12

| 1 | CELL ID_A |
| | QUALITY INFORMATION_A |
| 2 | CELL ID_B |
| | QUALITY INFORMATION_B |
| 3 | CELL ID_C |
| | QUALITY INFORMATION_C |
| ... | ... |
| n | CSG CELL FLAG |
| | CELL ID_D |
| | QUALITY INFORMATION_D |
| ... | ... |

MOBILE COMMUNICATION SYSTEM, BASE STATION DEVICE, MOBILE STATION DEVICE AND MOBILE COMMUNICATION METHOD

TECHNICAL FIELD

The present invention relates to a mobile communication system, a base station device, a mobile station device and a mobile communication method.

This application claims priority to and the benefit of Japanese Patent Application No. 2008-072494 filed on Mar. 19, 2008, the contents of which are incorporated herein by reference.

BACKGROUND ART

Currently, small base station devices provided in homes or offices have been studied. A small base station device is connected to, for example, a fixed line in a home and used to expand a communication area or provide user-specific service.

A small base station device is called home node B by the standardization group, 3GPP (3rd generation partnership project).

Further, a cell of a home node B that restricts users allowed to use the home node B by registering users allowed to access the home node B in advance is specifically called a CSG (closed subscriber group) cell (see Non-Patent Document 1). The CSG cell can also be called a femto cell, but their usage and meaning are the same.

A CSG cell in EUTRA (evolved universal terrestrial radio access) that is an evolved version of a third-generation mobile communication system has been studied by 3GPP.

A mobile station device incapable of identifying CSG cells in which its own terminal has been registered, CSG cells in which the terminal has not been registered, and normal cells attempts to access the CSG cells in which the terminal has not been registered, thus wasting consumption power or radio resource.

Accordingly, a technique capable of autonomously identifying that a mobile station device is located in an area of a registered CSG cell has been studied in EUTRA. Various methods may be used for a mobile station device to detect a registered CSG cell. For example, there is a method by which a mobile station device detects a registered CSG cell based on a position specified by a GPS (global positioning system) or IDs of a plurality of neighboring cells (Non-Patent Document 2).

When a mobile station device determines that its own terminal is located in an area of a registered CSG cell using one of the methods, the mobile station device initiates measurement of the CSG cell. When the measurement of the CSG cell in which the terminal has been registered can be performed for a reason such as discontinuous reception in the mobile station device, particular control for the measurement is unnecessary.

However, when a time to measure the CSG cell in which the terminal has been registered is not sufficient for a reason such as the mobile station device being in communication with the base station device (in an active state), requesting the base station device to create a gap for CSG cell measurement has been proposed (Non-Patent Document 3). A gap refers to an interval in which communication between a mobile station device and a base station device is not performed.

FIG. 28 is a sequence diagram illustrating a process in which a mobile station device requests a base station device to create a gap for CSG cell measurement. FIG. 29 is a sequence diagram illustrating another process in which the mobile station device requests the base station device to create the gap for CSG cell measurement. When the mobile station device is in communication with a base station device in a source cell and detects that the terminal is in an area of the CSG cell using one of the methods (step S001), the mobile station device transmits a gap request to the base station device in the source cell (step S002).

For the gap request, a message for the gap request may be transmitted or the gap request may be transmitted simultaneously with a measurement report message for reporting downlink reception quality from the mobile station device to the base station device in the source cell.

The base station device in the source cell having received the gap request transmits a gap control message including gap creation permission and gap information required for the gap to the mobile station device (step S003).

The gap information includes information required for the CSG cell measurement, such as a gap length (gap interval), start timing, and a period.

The mobile station device performs a CSG cell measurement process during the designated gap interval (a measurement process in the gap) (step S004). The mobile station device transmits content measured during the gap interval, as a measurement report message, to the base station device (step S005).

The base station device in the source cell instructs the mobile station device to stop the gap (step S006). The base station device instructs to stop the gap when the base station device determines that the CSG cell measurement is unnecessary based on the measurement report message in step S005 or when a predetermined time has elapsed from gap permission (step S106 in FIG. 29).

Since a process of steps S101 to S105 in FIG. 29 is the same as that of steps S001 to S004 and S006 in FIG. 28, the description thereof is omitted.

For a gap stop instruction, a handover instruction message (also referred to as a handover command) may be used instead. Alternatively, an available time of the gap may be designated upon the gap permission and an explicit message may be omitted.

In a CSG cell measurement process in a related art, a mobile station device autonomously detects that a terminal is located in an area of a CSG cell. Accordingly, when the CSG cell area is erroneously detected, when an installation site of the CSG cell is changed, or when the CSG cell is powered off, the CSG cell is not detected by the mobile station device and consumption power for the measurement is wasted.

When the base station device needs to create the gap interval for the CSG cell measurement, the mobile station device does not sufficiently use information on the CSG cell in which its own terminal has been registered even when the mobile station device has the information. Accordingly, an effective gap cannot be created.

Non-Patent Document 1: 3GPP TS36.300, Overall description; Stage2.V8.3.0 (http://www.3gpp.org/ftp/Specs/html-info/36300.htm)

Non-Patent Document 2: Huawei, "Cell re-selection for hNB", R2-074831, 3GPP TSG-RAN WG2 Meeting #60, Jeju, South Korea, 5-9 Nov. 2007

Non-Patent Document 3: T-Mobile, et al. "Text proposal for CSG related mobility", R2-075453, 3GPP TSG-RAN WG2 Meeting #60, Jeju, South Korea, 5-9 Nov. 2007

DISCLOSURE OF INVENTION

Problem to be Solved by the Invention

The present invention has been achieved in view of the above circumstances, and it is an object of the present invention to provide a mobile communication system, a base station device, a mobile station device and a mobile communication method that are capable of improving detection accuracy for a small base station device, reducing power consumption, and improving use efficiency of radio resources.

Means for Solving the Problem (1) The present invention has been made to solve the above-described problems. According to an aspect of the present invention, there is provided a mobile communication system including a mobile station device, a first base station device with which the mobile station device is communicating, and a second base station device that restricts users allowed to access the second base station device through registration, wherein when the mobile station device detects that the mobile station device is in an area of a cell of the second base station device in which the mobile station device has been registered, the mobile station device transmits information of the cell of the second base station device to the first base station device, and the first base station device is capable of updating control information required for the mobile station device to measure the cell of the second base station device with respect to the mobile station device, based on the received information of the cell of the second base station device and neighboring cell information stored in the first base station device.

(2) In the mobile communication system according to the aspect of the present invention, information of the cell of the second base station device may include a frequency of the cell of the second base station device.

(3) In the mobile communication system according to the aspect of the present invention, the mobile station device may update the control information required to measure the cell of the second base station device, and may perform measurement of the cell of the second base station device based on the control information.

(4) In the mobile communication system according to the aspect of the present invention, the first base station device may set a gap for the mobile station device to measure the cell of the second base station device, with respect to the mobile station device, based on the received information of the cell of the second base station device and the neighboring cell information stored in the first base station device.

(5) In the mobile communication system according to the aspect of the present invention, the cell of the second base station device may be a CSG cell.

(6) According to another aspect of the present invention, there is provided a mobile station device that communicates with a first base station device, wherein the mobile station device transmits information of a cell of a second base station device in which the mobile station device has been registered, to the first base station device, when the mobile station device detects that the mobile station device is in an area of the cell of the second base station device, and the mobile station device performs measurement of the cell of the second base station device based on control information required for the mobile station device to measure the cell of the second base station device, the control information being updated by the first base station device based on the received information of the cell of the second base station device and neighboring cell information stored in the first base station device.

(7) According to further another aspect of the present invention, there is provided a base station device that communicates with a mobile station device, wherein the base station device receives information of a cell of another base station device in which the mobile station device has been registered, the information being transmitted from the mobile station device when it is detected that the mobile station device is in an area of the cell of the other base station device, and the base station device is capable of updating control information required for the mobile station device to measure the cell of the other base station device, with respect to the mobile station device, based on the received information of the cell of the other base station device and stored neighboring cell information.

(8) According to further another aspect of the present invention, there is provided a mobile communication method using a mobile station device, a first base station device with which the mobile station device is communicating, and a second base station device that restricts users allowed to access the second base station device through registration, wherein when the mobile station device detects that the mobile station device is in an area of a cell of the second base station device in which the mobile station device has been registered, the mobile station device transmits information of the cell of the second base station device to the first base station device, and the first base station device is capable of updating control information required for the mobile station device to measure the cell of the second base station device, with respect to the mobile station device, based on the received information of the cell of the second base station device and neighboring cell information stored in the first base station device.

Effect of the Invention

In the mobile communication system, the base station device, the mobile station device and the mobile communication method of the present invention, it is possible to improve detection accuracy for the small base station device, reduce power consumption, and improve use efficiency of radio resources.

BRIEF DESCRIPTION OF THE DRAWINGS

FIG. 11A is a diagram illustrating an example of a data structure of a gap request message transmitted by the mobile station device 500 according to the first embodiment of the present invention.

FIG. 11B is a diagram illustrating an example of another data structure of a gap request message transmitted by the mobile station device 500 according to the first embodiment of the present invention.

FIG. 12 is a diagram illustrating an example of another data structure of a gap request message transmitted by the mobile station device 500 according to the first embodiment of the present invention.

Figure 1A:
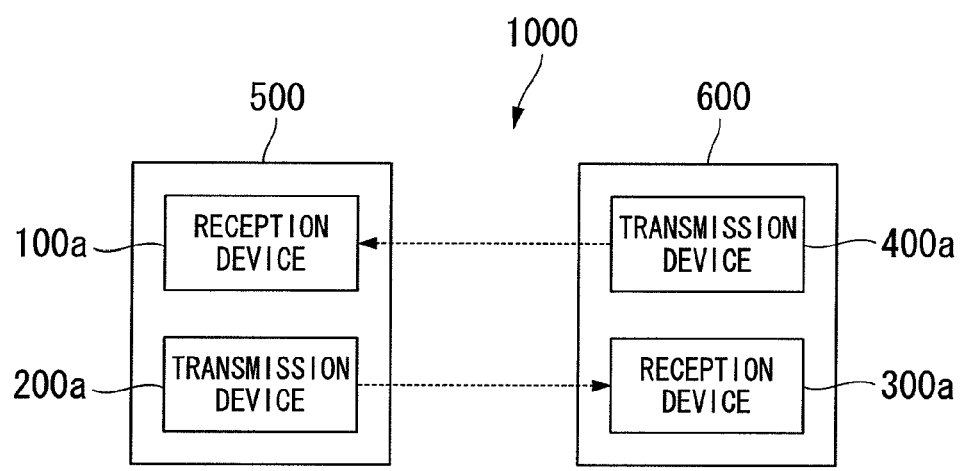
FIG. 1A is a schematic diagram of a mobile communication system 1000 according to a first embodiment of the present invention.

REFERENCE SYMBOLS 100a, 100b, 100c: reception device, 101: reception unit, 102: reception signal processing unit, 103: position detection unit, 104: CSG cell information registration unit, 105: search result determination unit, 200a, 200c: transmission device, 201: gap request generation unit, 202: CSG cell information registration unit, 203: transmission signal processing unit, 204: transmission unit, 205: CSG cell search request generation unit, 300a, 300c: reception device, 301: reception unit, 302: reception signal processing unit, 303: gap request processing unit, 304: neighboring cell information management unit, 305: search request processing unit, 400a, 400b, 400c: transmission device, 401, 411: gap control message generation unit, 402: neighboring cell information management unit, 403: transmission signal processing unit, 404: transmission unit, 405: measurement control message generation unit, 500: mobile station device, 600: base station device, A1, A2, A3, A4: antenna

BEST MODE FOR CARRYING OUT THE INVENTION

Hereinafter, embodiments of the present invention will be described with reference to the accompanying drawings.

Physical channels used in EUTRA include a broadcast channel, an uplink data channel, a downlink data channel, a downlink common control channel, an uplink common control channel, a random access channel, a synchronization channel (SCH), a reference signal, and so on.

New physical channels are likely to be added, but the description thereof will be omitted because the addition does not affect the description of the embodiments of the present invention. The reference signal includes a downlink reference signal and an uplink reference signal.

Since the physical channels in the embodiment of the present invention are the SCH, the BCH, and the downlink reference signal, a detailed description of the other physical channels will be omitted.

The SCH is used for a mobile station device to quickly detect a base station device. The SCH includes three types of primary SCHs (P-SCHs) and 31 types of secondary SCHs (S-SCHs) in which codes are alternately arranged. A combination of P-SCH and S-SCH signals is used to indicate 504 cell IDs for identifying base station devices and frame timing for radio synchronization.

The SCH is also referred to as a synchronization signal, but their usage and meaning are the same.

The broadcast channel (BCH) is transmitted from a base station device in order to notify of a control parameter used in common by mobile station devices in a cell. The BCH includes a primary BCH (P-BCH) and a dynamic BCH (D-BCH).

The P-BCH is defined in advance to be transmitted in a predetermined period in a time and a frequency. Accordingly, a mobile station device can receive a P-BCH of a cell whose cell ID is identified. Meanwhile, in the D-BCH, transmission resource allocation can be notified through the downlink common control channel or the P-BCH and changed for each cell. A global ID (also referred to as a global cell ID) that is at least greater in number than a cell ID, one global ID being allocated to each cell, and area information (also referred to as a tracking area or a tracking area ID) are included in the P-BCH and the D-BCH.

The downlink reference signal is a pilot signal transmitted at a predetermined power in each cell, in principle. The downlink reference signal is periodically repeated at predetermined time intervals (e.g., 1 frame). The mobile station device receives the downlink reference signal at predetermined time intervals and uses the downlink reference signal to determine reception quality of each cell. The downlink reference signal is used as a reference signal for demodulation of downlink data transmitted simultaneously with the downlink reference signal.

Other sequences that can be uniquely identified in each cell may be used in the downlink reference signal.

The downlink reference signal is referred to as a downlink reference signal or a DL-RS (downlink reference signal), but their usage and meaning are the same.

(First Embodiment)

First, a first embodiment of the present invention will be described.

FIG. 1A is a schematic diagram of a mobile communication system 1000 according to the first embodiment of the present invention. The mobile communication system 1000 includes a mobile station device 500 and a base station device 600.

Figure 1B:
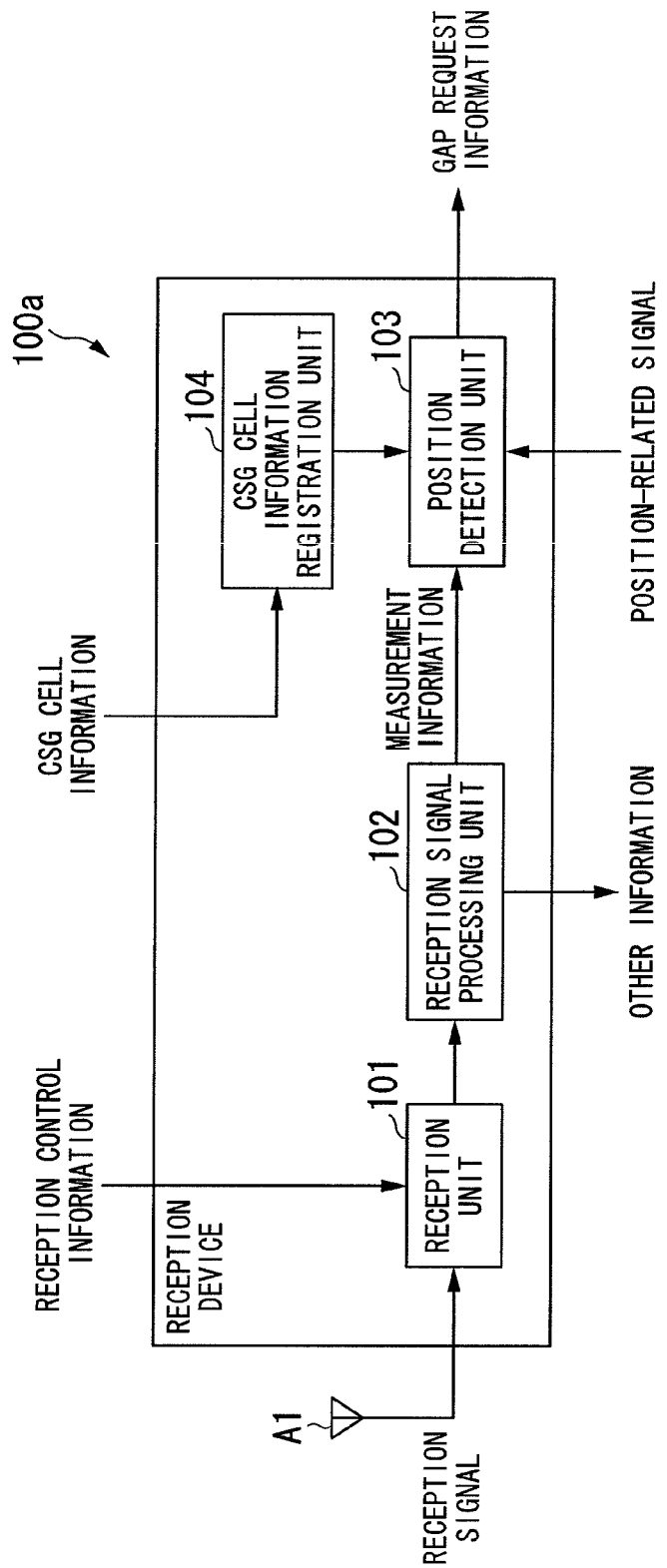
FIG. 1B is a schematic block diagram illustrating a configuration of a reception device 100*a* in a mobile station device 500 according to the first embodiment of the present invention.
Figure 2:
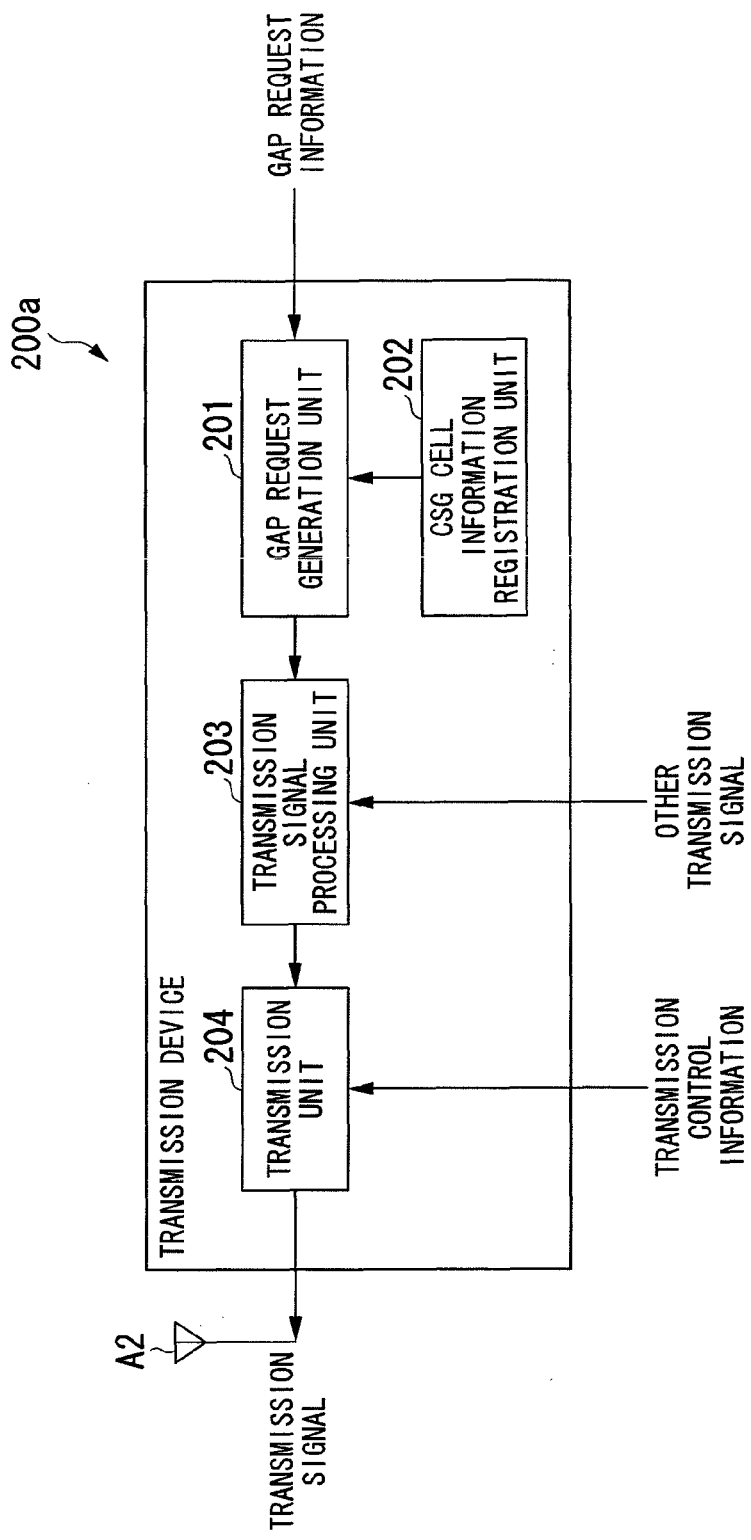
FIG. 2 is a schematic block diagram illustrating a configuration of a transmission device 200*a* in the mobile station device 500 according to the first embodiment of the present invention.

The mobile station device 500 includes a reception device 100*a* (FIG. 1B that will be described later) and a transmission device 200*a* (FIG. 2 that will be described later).

Figure 3:
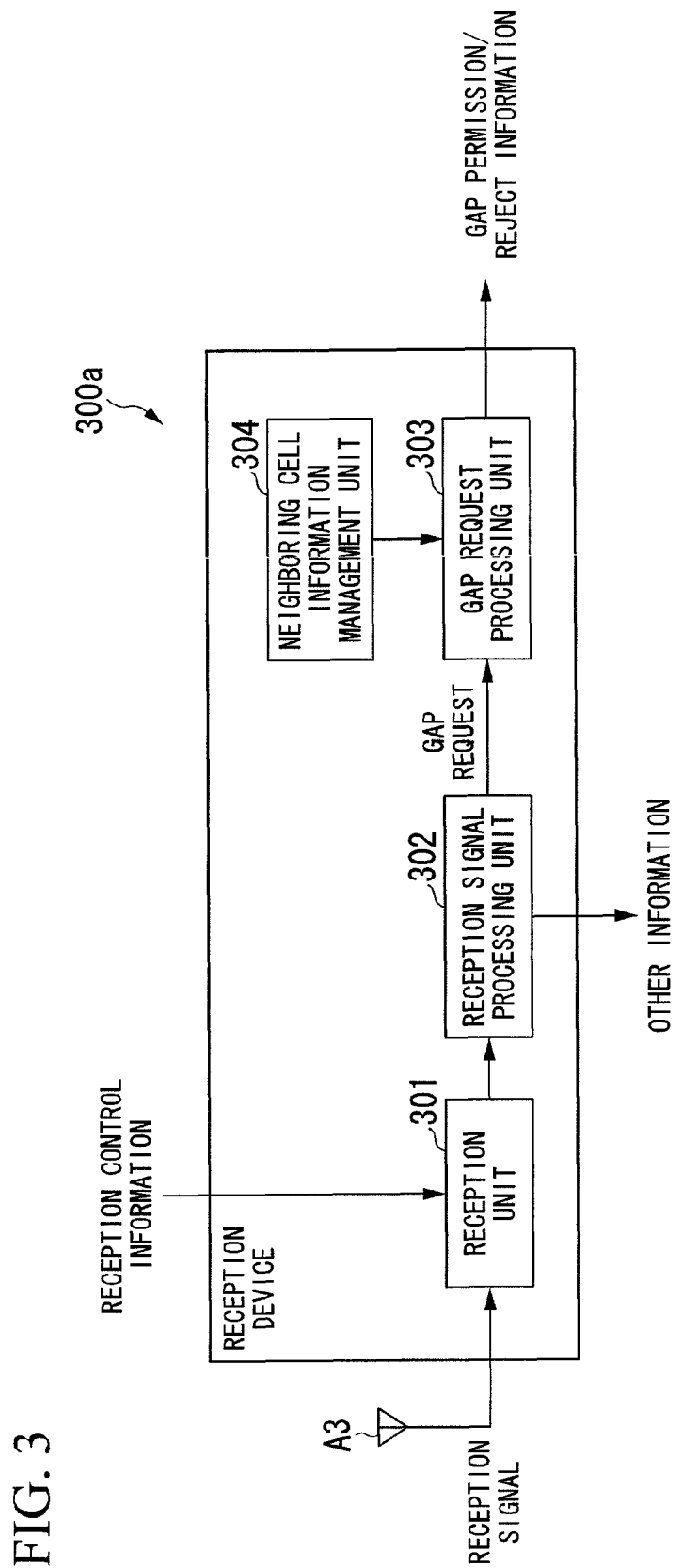
FIG. 3 is a schematic block diagram illustrating a configuration of a reception device 300*a* in a base station device according to the first embodiment of the present invention.
Figure 4:
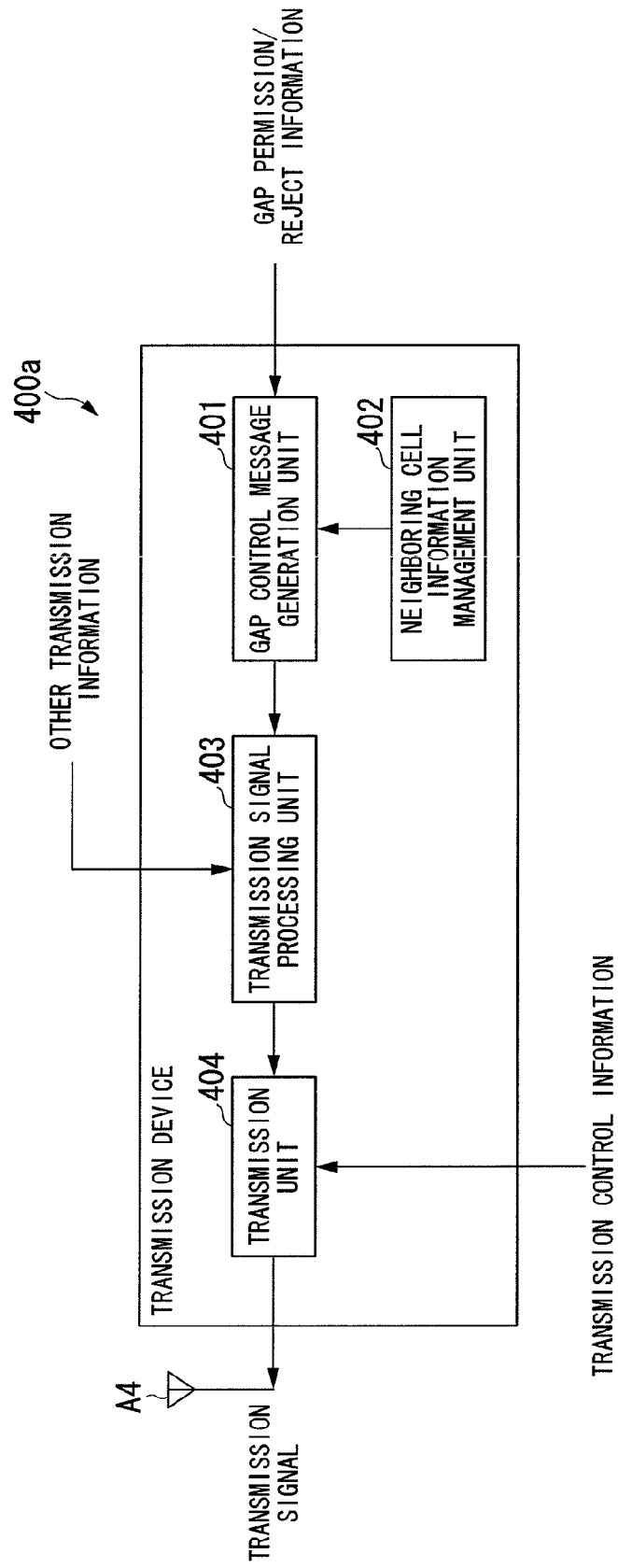
FIG. 4 is a schematic block diagram illustrating a configuration of a transmission device 400*a* in the base station device according to the first embodiment of the present invention.

The base station device 600 includes a reception device 300*a* (FIG. 3 that will be described later) and a transmission device 400*a* (FIG. 4 that will be described later).

The reception device 100*a* of the mobile station device 500 receives a signal transmitted by the transmission device 400*a* of the base station device 600. The reception device 300*a* of the base station device 600 receives a signal transmitted by the transmission device 200*a* of the mobile station device 500.

FIG. 1B is a schematic block diagram illustrating a configuration of the reception device 100*a* in the mobile station device 500 according to the first embodiment of the present invention. The reception device 100*a* includes a reception unit 101, a reception signal processing unit 102, a position detection unit 103, a CSG cell information registration unit 104, and an antenna A1.

The reception signal (a transmission signal from the base station device 600) is received by the reception unit 101 via the antenna A1. In the reception unit 101, the reception signal is demodulated based on reception control information indicating a channel schedule.

A reception timing, a multiplexing method, resource arrangement information and demodulation-related information for each channel is included in the reception control information.

According to the reception control information, the reception unit 101 demodulates and decodes the reception signal of each channel, and outputs a resultant signal to the reception signal processing unit 102. The reception signal processing unit 102 processes the input signal of each channel. The reception signal processing unit 102 generates measurement information from measurement-related information and outputs the measurement information to the position detection unit 103.

The measurement information includes a cell ID detected from an SCH, reception quality of a downlink reference signal, area information obtained from report information and so on. Information other than the measurement information (e.g., user traffic data and downlink control data) processed in the reception signal processing unit 102 is input as other information to an individual processing block. Since the other information is not related to the present embodiment, the description thereof will be omitted.

CSG cell information is registered in the CSG cell information registration unit 104 in advance. The CSG cell information includes information that can uniquely specify a CSG cell registered by the mobile station device 500. The CSG cell information is also referred to as a white list.

For example, the CSG cell information includes all or some of area information, cell ID (also referred to as CSG ID), frequency, bandwidth, global ID, communication system, GPS information, IP (Internet protocol) address and so on.

When the mobile station device 500 is registered in a plurality of CSG cells, a plurality of CSG cell information may be used. The CSG cell information is registered in the CSG cell information registration unit 104 using arbitrary method.

The position-related information is input to the position detection unit 103, if necessary. The position-related information is a signal transmitted from a device other than the base station device 600, such as a GPS signal.

The position detection unit 103 compares the measurement information and the position-related information with the CSG cell information registered in the CSG cell information registration unit 104. The position detection unit 103 determines whether its own terminal has entered the communication area of the registered CSG cell or not.

The determination may be made by determining whether the position information acquired from the GPS information is in a predetermined range or not. When a plurality of detected cell IDs match IDs of neighboring cells of the CSG cell and a quality is equal to or greater than a predetermined value, the position detection unit 103 determines whether its own terminal has entered the communication area of the registered CSG cell or not. Other determination methods may be used. For example, a user explicitly indicates that its own terminal is in the area.

When the position detection unit 103 determines that the terminal has entered the communication area of the registered CSG cell and CSG cell measurement cannot be quickly initiated for a reason such as the mobile station device 500 being in communication (in an active state), the mobile station device 500 generates and transmits gap request information to request the base station device 600 to provide a gap for CSG cell measurement.

FIG. 2 is a schematic block diagram illustrating a configuration of the transmission device 200*a* in the mobile station device 500 according to the first embodiment of the present invention. The transmission device 200*a* includes a gap request generation unit 201, a CSG cell information registration unit 202, a transmission signal processing unit 203, a transmission unit 204, and an antenna A2.

The gap request information generated by the position detection unit 103 in FIG. 1B is input to the gap request generation unit 201.

The gap request generation unit 201 acquires information on the CSG cell in which its own terminal has registered, from the CSG cell information registration unit 202, generates a gap request message including the CSG cell information, and outputs the gap request message to the transmission signal processing unit 203. The CSG cell information may be acquired from the CSG cell information registration unit 104 of FIG. 1B, with the CSG cell information registration unit 202 not provided in the transmission device 200a.

The transmission signal processing unit 203 performs proper scheduling on the gap request message from the gap request generation unit 201 and other transmission signals. The other transmission signals include uplink user traffic data, uplink control data, uplink reference signal and so on.

The data scheduled by the transmission signal processing unit 203 is output as a transmission signal by the transmission unit 204 via the antenna A2 based on transmission control information. A transmission timing, a multiplexing method, resource arrangement information and modulation-related information for each channel are included in the transmission control information.

In FIGS. 1B and 2, since other units of the mobile station device 500 are not related to the present embodiment, the description thereof will be omitted.

FIG. 3 is a schematic block diagram illustrating a configuration of the reception device 300a in the base station device 600 according to the first embodiment of the present invention. The reception device 300a includes a reception unit 301, a reception signal processing unit 302, a gap request processing unit 303, a neighboring cell information management unit 304, and an antenna A3.

A reception signal (the transmission signal from the mobile station device 500) is received by the reception unit 301 via the antenna A3. In the reception unit 301, the reception signal is demodulated based on reception control information indicating a channel schedule.

A reception timing, a multiplexing method, resource arrangement information, and demodulation-related information for each channel of each mobile station device 500 are included in the reception control information. According to the reception control information, the reception unit 301 demodulates and decodes the reception signal of each channel and outputs a resultant signal to the reception signal processing unit 302.

The reception signal processing unit 302 separates the input signal for each mobile station device 500, and properly processes each channel. When the gap request message is received, the reception signal processing unit 302 outputs information (gap request information) in the gap request message to the gap request processing unit 303.

Mobile station device information (e.g., user traffic data and uplink control data) other than the gap request processed by the reception signal processing unit 302 is input as other information to an individual processing block. Since the other information is not particularly related to the present embodiment, the description thereof will be omitted.

Cell information (neighboring cell information) of base station devices deployed around the base station device 600 is registered in the neighboring cell information management unit 304.

The neighboring cell information is a plurality of information for uniquely identifying cells. For example, area information, cell ID, frequency, bandwidth, global ID, communication system, GPS information, IP address, neighboring cell measurement result and so on are registered as the neighboring cell information.

A plurality of neighboring cell information corresponding in number to the neighboring cell are used and registered using arbitrary method. Each time the gap request information is received, the registered content may be updated.

The gap request information and the neighboring cell information are input to the gap request processing unit 303. The gap request processing unit 303 determines gap permission/reject based on the CSG cell information in the gap request information and the neighboring cell information. The gap request processing unit 303 outputs gap permission/reject information including information indicating gap permission or reject based on the determination result.

For example, when the CSG cell information is included in the neighboring cell information, the gap request processing unit 303 determines the gap permission, and when the CSG cell is not included in the neighboring cell information, the gap request processing unit 303 determines the gap reject. The gap request processing unit 303 may determine the gap reject when the CSG cell information is included in the neighboring cell information but there is no response in a predetermined time.

FIG. 4 is a schematic block diagram illustrating a configuration of the transmission device 400a in the base station device 600 according to the first embodiment of the present invention. The transmission device 400a includes a gap control message generation unit 401, a neighboring cell information management unit 402, a transmission signal processing unit 403, a transmission unit 404, and an antenna A4.

The gap permission/reject information generated by the gap request processing unit 303 of FIG. 3 is input to the gap control message generation unit 401.

When the information indicating the gap permission is included in the gap permission/reject information, the gap control message generation unit 401 acquires, from the neighboring cell information management unit 402, neighboring cell information corresponding to the CSG cell of the mobile station device 500 included in the gap request. The neighboring cell information may be acquired from the neighboring cell information management unit 304 of FIG. 3 when the neighboring cell information management unit 402 is not provided.

The gap control message generation unit 401 determines optimal gap information in consideration of the neighboring cell information, generates a gap control message including gap permission and gap information, and outputs the gap control message to the transmission signal processing unit 403.

Meanwhile, when the gap reject information is included in the gap permission/reject information, the gap control message generation unit 401 generates a gap control message including information indicating the gap reject and outputs the gap control message to the transmission signal processing unit 403.

The transmission signal processing unit 403 performs proper scheduling on the gap control message from the gap control message generation unit 401 and other transmission signals. The other transmission signals include downlink user traffic data, downlink control data, downlink reference signal and so on of each mobile station device 500.

Data scheduled by the transmission signal processing unit 403 is output as a transmission signal by the transmission unit 404 via the antenna A4 based on transmission control information. A transmission timing, a multiplexing method, resource arrangement information and modulation-related information for each channel are included in the transmission control information.

In FIGS. 3 and 4, since other units of the base station device are not related to the present embodiment, the description thereof will be omitted.

Figure 5:
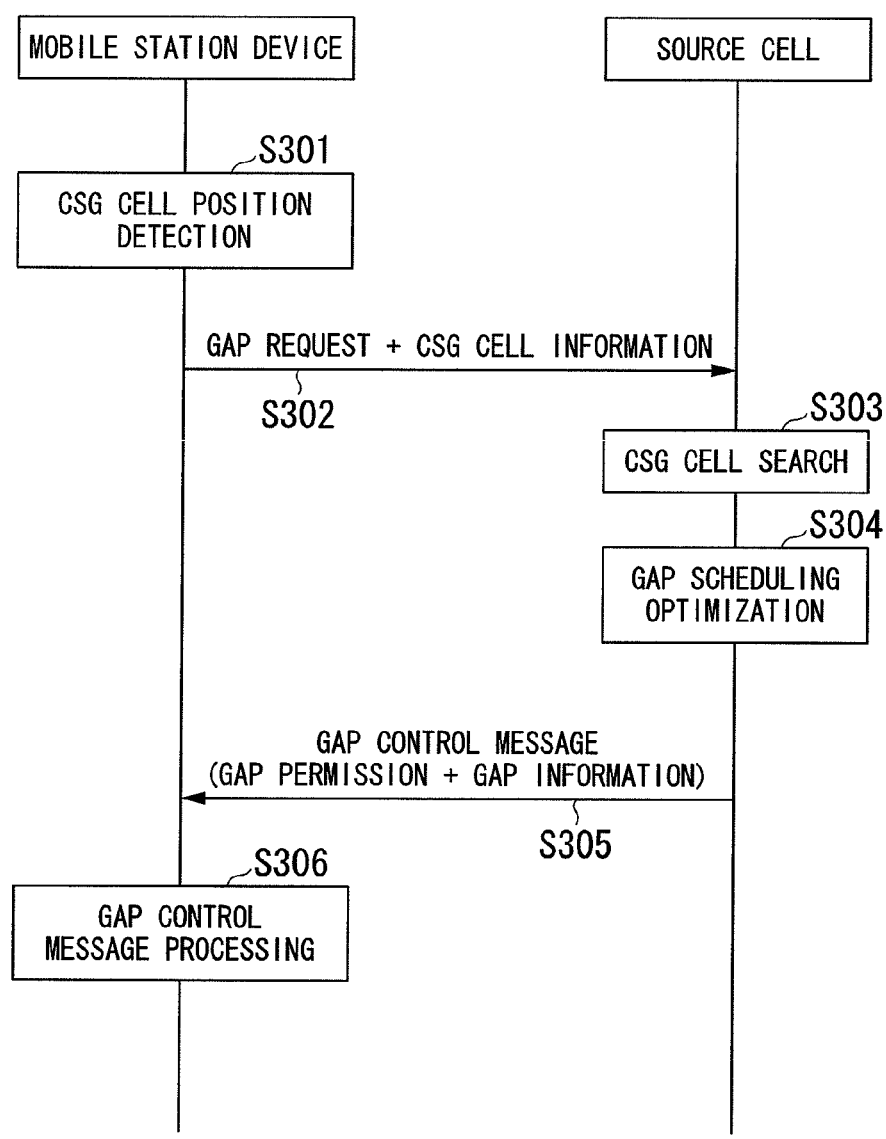
FIG. 5 is a sequence diagram illustrating a gap request process for CSG cell measurement according to the first embodiment of the present invention.

FIG. 5 is a sequence diagram illustrating a gap request process for CSG cell measurement according to the first embodiment of the present invention. As shown in FIG. 5, the mobile station device 500 is in communication with the base station device 600 in the source cell (in an active state).

In the sequence diagram of FIG. 5, the case where the gap request from the mobile station device 500 is permitted by the base station device 600 in the source cell is shown. A resource allocation process in transmission or reception and so on will be omitted.

First, the mobile station device 500 detects that its own terminal is located in the area of the registered CSG cell (step S301). Arbitrary detection method may be used. For example, the detection may be autonomously performed based on IDs or GPS information of neighboring cells as described above. Alternatively, a user explicitly indicates, to the mobile station device 500, that the terminal is located in the area.

When a gap for the CSG cell measurement is necessary, the mobile station device 500 having detected (or having received an indication indicating) that the terminal is located in the CSG cell area generates a gap request message. The mobile station device 500 includes at least one CSG cell information in the gap request message and transmits the gap request message to the base station device 600 in the source cell (step S302).

When receiving the gap request message from the mobile station device 500, the base station device 600 of the source cell searches for the CSG cell indicated by the received CSG cell information to determine whether the CSG cell is deployed as a neighboring cell of the source cell or not (step S303). Here, the neighboring cell includes a cell using a different frequency or communication system from the source cell.

The CSG cell may be searched from the neighboring cell information stored in the base station device 600, or the base station device 600 may ask neighboring base station devices about the presence of the cell.

When the CSG cell is deployed as a neighboring cell, the base station device 600 of the source cell performs optimal gap scheduling so that the mobile station device 500 can measure the CSG cell (step S304).

The optimal gap scheduling means setting a gap length (gap interval), a gap number, a gap interval or the like to match transmission timing for an SCH or a BCH of a CSG cell. Such a setting is performed by the source cell based on schedule information such as traffic or resource use efficiency, as well as the CSG cell information.

The base station device 600 of the source cell transmits the gap control message to the mobile station device 500 (step S305). The gap permission information and gap information indicating gap scheduling are included in control information (gap control information) set in the gap control message.

The mobile station device 500 having received the gap control message extracts the gap control information. The mobile station device 500 initiates measurement of the CSG cell in which its own terminal has been registered, during a gap interval according to the content of the gap control message (step S306). The processing in step S306 is referred to as gap control message processing.

Figure 6:
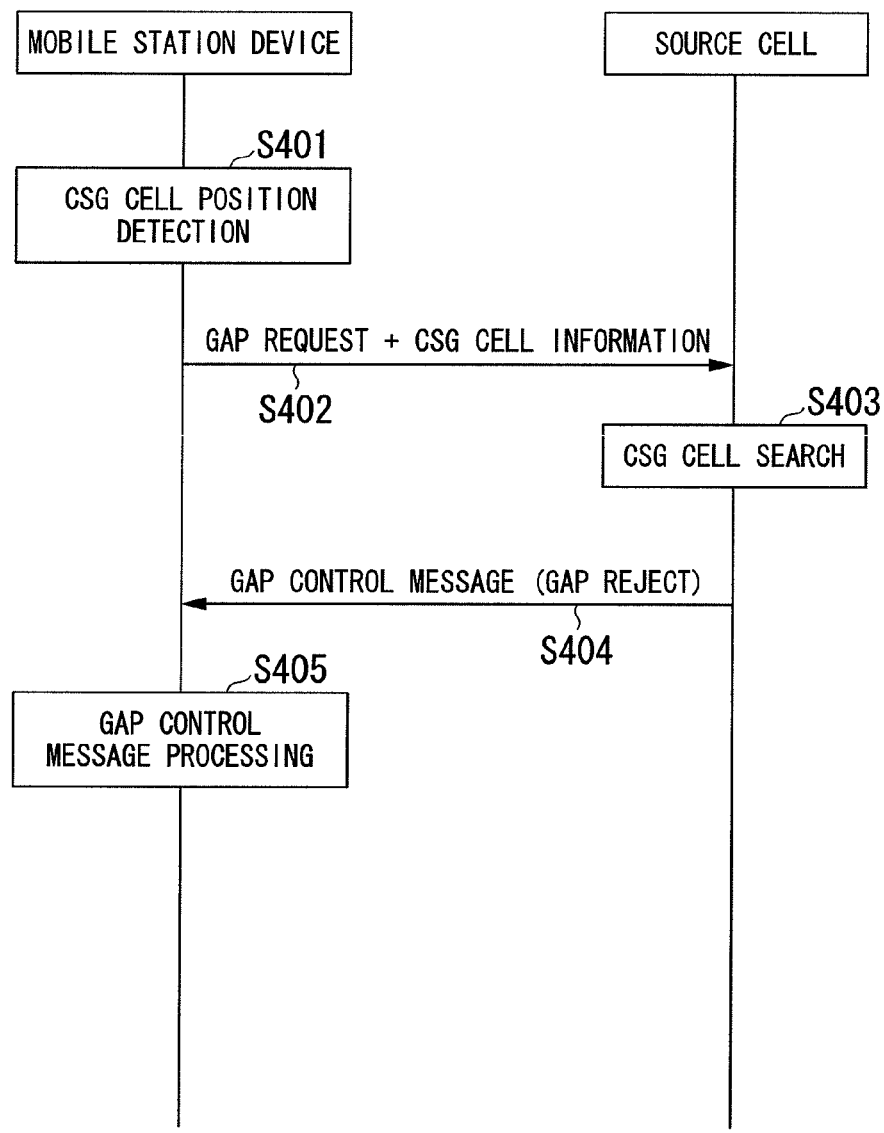
FIG. 6 is another sequence diagram illustrating a gap request process for CSG cell measurement according to the first embodiment of the present invention.

FIG. 6 is another sequence diagram illustrating a gap request process for CSG cell measurement according to the first embodiment of the present invention. As shown in FIG. 6, the mobile station device 500 is in communication with the base station device 600 of the source cell (in an active state).

In the sequence diagram of FIG. 6, the case where the gap request from the mobile station device 500 is rejected by the base station device 600 of the source cell is shown. A resource allocation process in transmission or reception and so on will be omitted.

Since a process (steps S401, S402, S403) in which the mobile station device 500 transmits the gap request to the source cell and the source cell searches for the CSG cell based on the gap request is the same as that in steps S301, S302 and S303 in FIG. 5, the description thereof will be omitted.

When the source cell determines that the source cell cannot generate the gap for a reason such as that the CSG cell is not included in the neighboring cells, the source cell includes information indicating gap reject in a gap control message, as control information (gap control information) set in the gap control message, and transmits the gap control message to the mobile station device 500 (step S404).

The mobile station device 500 having received the gap control message extracts the gap control information, and recognizes that the gap request has been rejected from the content of the message. The mobile station device 500 continues to perform reception control according to current scheduling (step S405). The processing in step S405 is referred to as gap control message processing.

The CSG cell position detection and the gap control message processing in the mobile station device 500 and the CSG cell search and the gap scheduling optimization process in the base station device 600 in FIGS. 5 and 6 are shown in detail in FIGS. 7 to 10, respectively.

Figure 7:
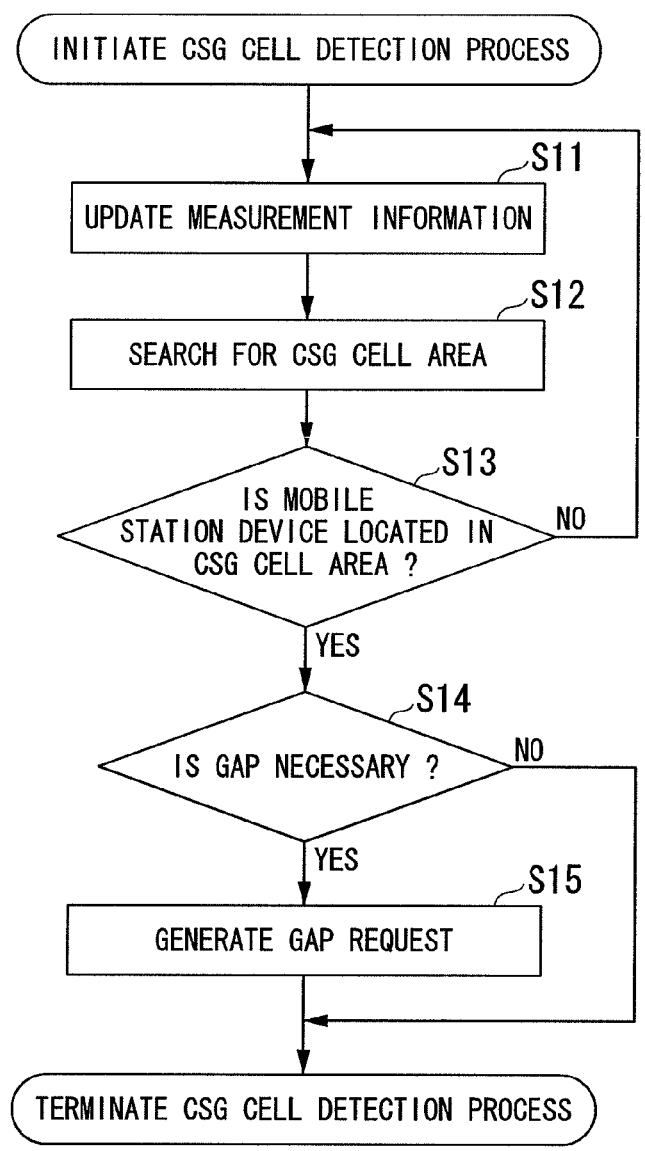
FIG. 7 is a flowchart illustrating a CSG cell area detection process in the mobile station device 500 according to the first embodiment of the present invention.

FIG. 7 is a flowchart illustrating the CSG cell area detection process in the mobile station device 500 according to the first embodiment of the present invention. The mobile station device 500 performs neighboring cell measurement periodically or when a specific event occurs, and updates measurement information (step S11). The mobile station device 500 receives position-related information.

Based on this measurement information, the mobile station device 500 performs a CSG cell area search process (step S12). The mobile station device 500 determines, through the CSG cell area search process, whether the mobile station device 500 is located in the CSG cell area or not (step S13). When the mobile station device 500 is not located in the CSG cell area, the mobile station device 500 returns to step S11, in which the mobile station device 500 continues to update the measurement information.

On the other hand, when it is determined that the mobile station device 500 is located in the CSG cell area, the mobile station device 500 determines whether a gap is necessary for the CSG cell measurement or not (step S14). When the gap is not required, that is, a reception is an discontinuous reception or the CSG cell and the source cell is in the same frequency, the process of the flowchart in FIG. 7 is terminated.

In other cases, when the gap is necessary, the mobile station device 500 performs the gap request generation process (step S15). In the gap request generation process, the mobile station device 500 sets information of the detected CSG cell and information required for the gap request as the gap request message.

Figure 8:
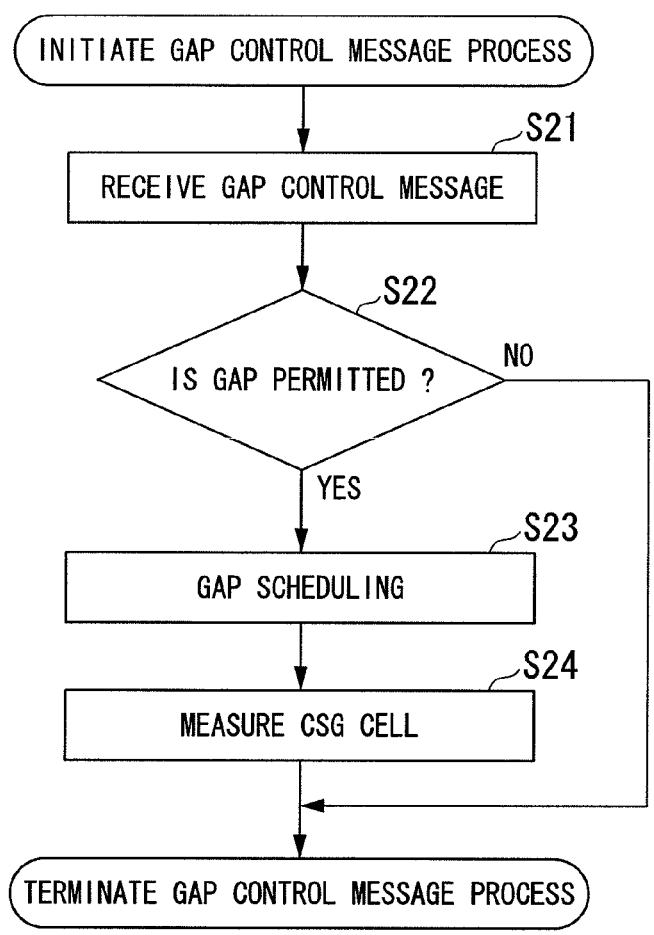
FIG. 8 is a flowchart illustrating a process after gap control message reception in the mobile station device 500 according to the first embodiment of the present invention.

FIG. 8 is a flowchart illustrating a process after gap control message reception in the mobile station device 500 according to the first embodiment of the present invention.

In the gap control message reception process, the mobile station device 500 receives a gap control message from the base station device 600 of the source cell (step S21).

The mobile station device 500 determines whether the gap is permitted from the gap control information set in the gap control message received in step S21 or not (step S22).

When the gap control message indicates the gap permission, the mobile station device 500 performs scheduling based on simultaneously received gap information in a gap scheduling process (step S23). The mobile station device 500 initiates CSG cell measurement during a gap interval (step S24). After completing the CSG cell measurement, the mobile station device 500 terminates the process of the flowchart in FIG. 8. Even when the gap permission is not indicated in step S22, the mobile station device 500 terminates the process of the flowchart shown in FIG. 8.

Figure 9:
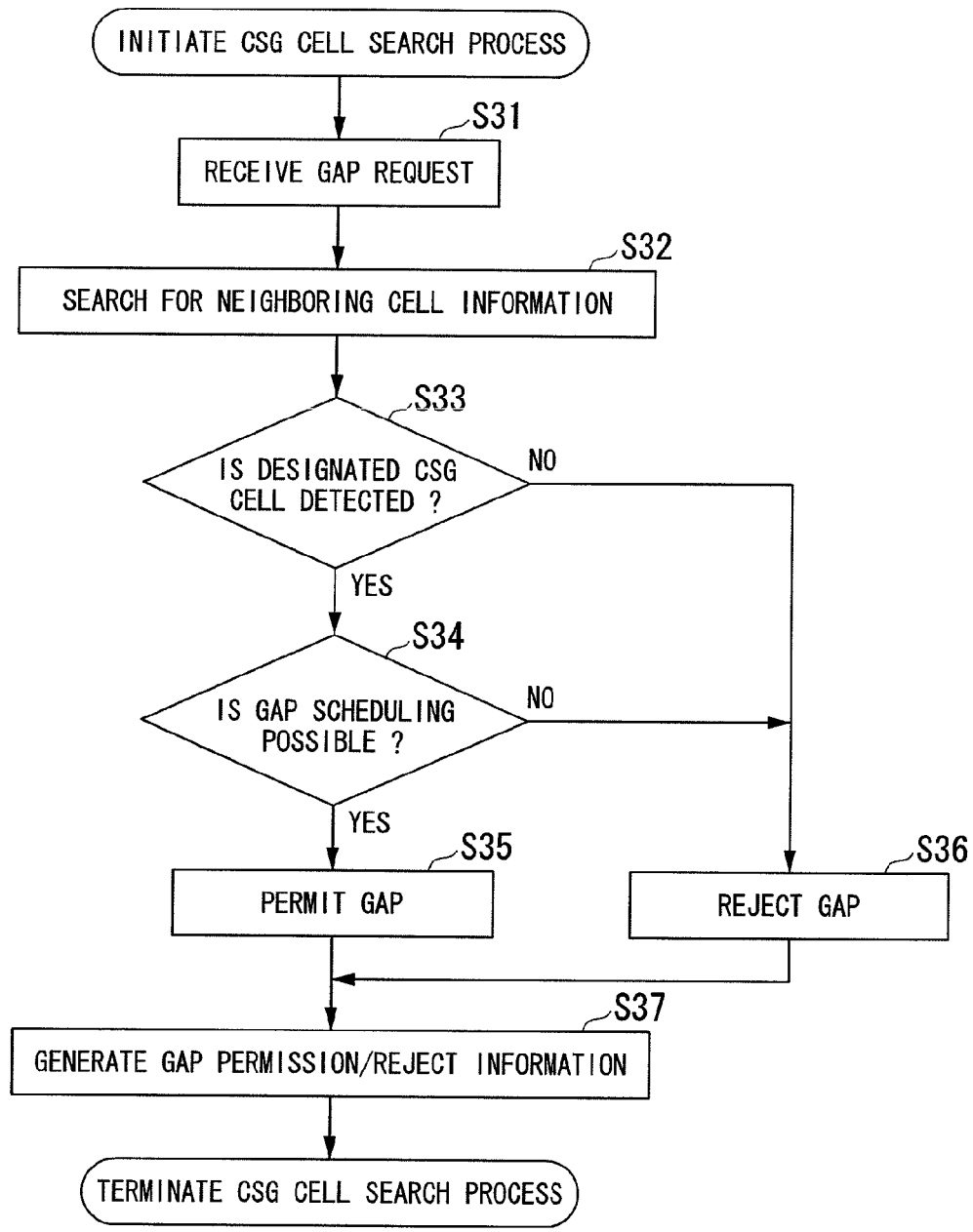
FIG. 9 is a flowchart illustrating a CSG cell search process after gap request reception in the base station device according to the first embodiment of the present invention.

FIG. 9 is a flowchart illustrating a CSG cell search process after gap request reception in the base station device 600 according to the first embodiment of the present invention. When the base station device 600 of the source cell receives a gap request message, the base station device 600 performs a gap request reception process (step S31). The base station device 600 acquires the gap request information included in the gap request message through the gap request reception process.

Subsequently, the base station device 600 searches for the CSG cell information in the gap request information to determine whether the CSG cell information is included in neighboring cell information or not (step S32). The neighboring cell information may be stored in the base station device 600 of the source cell in advance, or may be obtained from the result of searching for the neighboring cells after gap request message reception.

The base station device 600 determines whether the CSG cell designated from the mobile station device 500 is included in the neighboring cell information or not (step S33). When the CSG cell is not included, the base station device 600 determines gap reject (step S36).

On the other hand, when the CSG cell is included, the base station device 600 determines whether the gap scheduling is possible or not (step S34). The determination as to whether gap scheduling is possible or not is based on, for example, traffic or a positional relationship between the mobile station device 500 and the CSG cell.

When the gap scheduling is possible, the base station device 600 determines gap permission (step S35). On the other hand, when the gap scheduling is impossible, the base station device 600 determines the gap reject (step S36).

The base station device 600 generates gap permission/reject information including the result of determining the gap permission or the gap reject in step S37 and terminates the process of the flowchart shown in FIG. 9.

Figure 10:
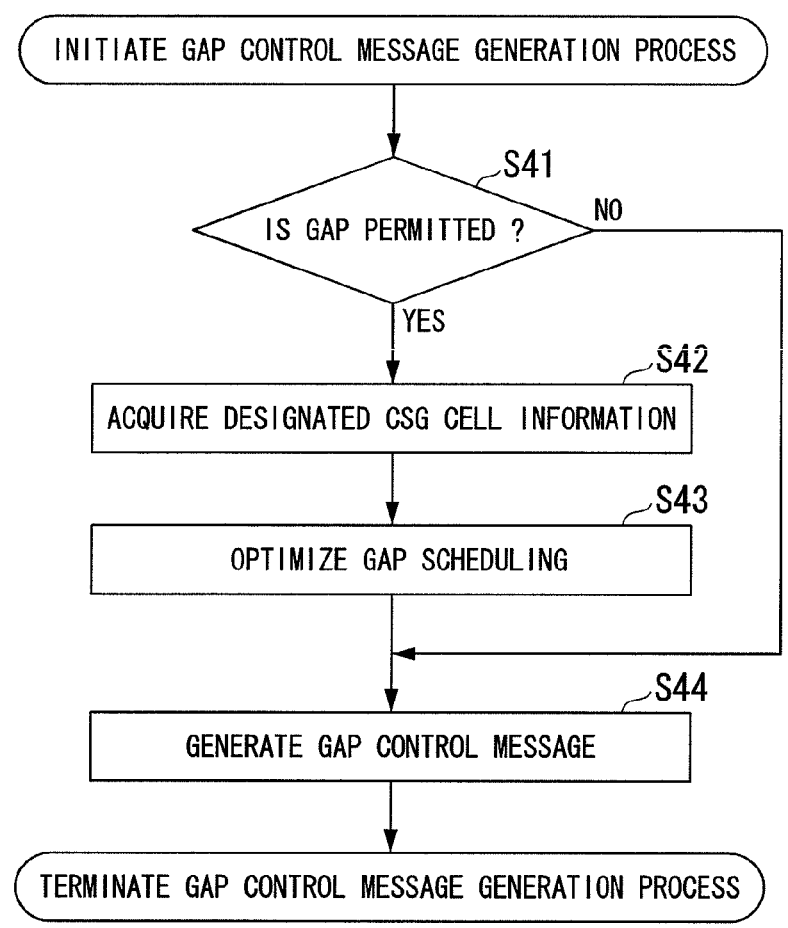
FIG. 10 is a flowchart illustrating a gap control message generation process in the base station device according to the first embodiment of the present invention.

FIG. 10 is a flowchart illustrating a gap control message generation process in the base station device 600 according to the first embodiment of the present invention.

First, the base station device 600 of the source cell confirms the gap permission/reject information, and determines whether to permit the gap in response to the gap request or not (step S41).

When the gap is permitted, the base station device 600 acquires information of the CSG cell (CSG cell information) notified of together with the gap request from the mobile station device 500 (step S42).

The base station device 600 generates information related to gap scheduling for CSG cell measurement, such as a transmission timing of the CSG cell, from the CSG cell information.

The base station device 600 performs optimal gap scheduling based on the CSG cell information (step S43). The base station device 600 generates a gap control message including gap permission information and gap scheduling information (step S44). When the gap is rejected, the base station device 600 proceeds to step S44, in which the base station device 600 generates a gap control message including gap reject information. After generating the gap control message, the base station device 600 terminates the process in the flowchart of FIG. 10.

The flowcharts of FIGS. 7 to 10 show examples of the process in the mobile station device 500 or the base station device 600, and the present invention is not limited to these processes. Other processes may be performed if the processes allow the mobile station device 500 to notify the base station device 600 of the CSG cell information together with the gap request, and allow the base station device 600 to make a determination as to the gap request in consideration of the CSG cell information.

FIG. 11A is a diagram illustrating an example of a data structure of the gap request message transmitted by the mobile station device 500 according to the first embodiment of the present invention. FIG. 11B is a diagram illustrating an example of another data structure of a gap request message transmitted by the mobile station device 500 according to the first embodiment of the present invention.

In FIG. 11A, a data structure including only the gap request is shown. In FIG. 11B, a data structure in which the gap request is included in information for measurement report is shown.

The mobile station device 500 includes, in the gap request, cell information required for the base station device 600 to uniquely specify the CSG cell in which the terminal has been registered, and transmits the gap request. When there are a plurality of CSG cells, the mobile station device 500 may include a required number of information in the gap request. Alternatively, the mobile station device 500 may select and set one CSG cell having high priority based on, for example, service continuity.

Here, the base station device 600 is notified only of information used for a communication system of the corresponding CSG cell as the CSG cell information included in the gap request message. For example, when two CSG cells employ a communication system 1 and a communication system 2, respectively, and a global ID is not introduced in the communication system 2, the global ID need not be included in CSG cell information of the communication system 2. This is shown in FIG. 11A.

That is, in FIG. 11A, only CSG cell information is included. In the first CSG cell using the communication system 1, cell identifier information (cell ID_A), frequency information (frequency information_A), and global identifier information (global ID_A) are notified of as the CSG cell information. In the second CSG cell using the communication system 2, cell identifier information (cell ID_B), frequency information (frequency information_B) and so on are notified of.

As shown in FIG. 11B, when a gap request is included in information for measurement report, cell information required for the base station device 600 to uniquely specify a CSG cell in which a terminal has been registered is included and transmitted. The included CSG cell information is the same as that in FIG. 11A.

That is, in FIG. 11B, CSG cell information different from a normal measurement report is included. As the measurement report, cell identifier information (cell ID_A) and quality information (quality information_A) are notified of for a first cell. Cell identifier information (cell ID_B) and quality information (quality information_B) are notified of for a second cell. Cell identifier information (cell ID_C) and quality information (quality information_C) are notified of for a third cell.

Cell identifier information (cell ID_D), frequency information (frequency information_D), and GPS information (GPS_D) for the first CSG cell are notified of as CSG cell information.

FIG. 12 is a diagram illustrating an example of another data structure of a gap request message transmitted by the mobile station device 500 according to the first embodiment of the present invention. As shown in FIG. 12, a normal measurement report message may be reused and a CSG cell flag may be used for a gap request. In this case, an unused value of a field used for a normal measurement report such as a cell ID or quality information is used or a specific value indicating that the terminal enters an area of the CSG cell may be set in a field to indicate the CSG cell, instead of using the CSG cell flag.

That is, in FIG. 12, the CSG cell information is included so that a data structure of the normal measurement report is not changed, if possible. That is, as a measurement report, cell identifier information (cell ID_A) and quality information (quality information_A) are notified of for the first cell. Cell identifier information (cell ID_B) and quality information (quality information_B) are notified of for the second cell. Cell identifier information (cell ID_C) and quality information (quality information_C) are notified of for the third cell. In addition to the measurement report such as the cell identifier information (cell ID_D) and the quality information (quality information_D), a CSG cell flag for a n-th cell that is the CSG cell, as the gap request, is notified of as the CSG cell information.

A data structure different from FIGS. 11A, 11B and 12 may be used as long as the data structure allows the base station device 600 to determine whether a request is a gap request for CSG cell measurement or not and accordingly is able to include at least one required CSG cell information.

The position detection unit 103 (also referred to as a determination unit) of the mobile station device 500 of the present embodiment determines whether to request or not the source cell (also referred to as a base station device) to provide control information (gap permission or gap information) for measuring a CSG cell (also referred to as a small base station device) that can be accessed by the mobile station device 500. In the present embodiment, the determination as to whether to request or not the source cell to provide the gap permission or gap information is made based on whether it can be detected that the terminal is in the area of the CSG cell or not (step S301 in FIG. 5).

When the position detection unit 103 determines that the gap permission or the gap information is requested, the transmission unit 204 (also referred to as a first transmission unit) sets the CSG cell information in the gap request (also referred to as request message) and transmits the gap request to the base station device 600 of the source cell (step S302 in FIG. 5).

The reception unit 101 (also referred to as a first reception unit) receives the gap control message (also referred to as a response message) transmitted from the base station device 600 of the source cell (step S305 in FIG. 5).

The reception signal processing unit 102 (also referred to as a measurement control execution unit) executes measurement control according to the gap permission or the gap information set in the gap control message received by the reception unit 101 (step S306 in FIG. 5).

The reception unit 301 of the base station device 600 of the present embodiment (also referred to as a second reception unit) receives a gap request (also referred to as request message) transmitted by the transmission unit 204 of the mobile station device 500 (step S302 in FIG. 5).

The gap request processing unit 303 (also referred to as a search unit) searches for a CSG cell from the neighboring cell based on the CSG cell information set in the gap request received by the reception unit 301 (step S303 in FIG. 5).

The transmission unit 404 (second transmission unit) sets the control information (gap permission or gap information) in the gap control message (also referred to as response message) based on the search result from the gap request processing unit 303, and transmits it to the mobile station device 500 (step S305 in FIG. 5).

According to the present embodiment, the mobile station device 500 can include the information on the CSG cell in which its own terminal has been registered, in the gap request and transmit the gap request to the base station device 600.

Further, the base station device 600 can determine whether the CSG cell of the mobile station device 500 is deployed in a neighboring area or not, and notify the mobile station device 500 of the determination result.

According to the present embodiment, the mobile station device 500 can transmit information for measuring the CSG cell in which its own terminal has been registered to the base station device 600. The base station device 600 can perform optimal gap scheduling on the CSG cell.

Thus, the CSG cell measurement efficiency in the mobile station device 500 is improved. Further, the base station device 600 can confirm whether the CSG cell notified of by the mobile station device 500 is deployed as a neighboring cell or not. Accordingly, a useless gap interval due to, for example, a detection error of the CSG cell area of the mobile station device 500, is not created and use efficiency of radio resources is improved.

Furthermore, unnecessary CSG cell measurement upon erroneous detection is suppressed and thus the power consumption of the mobile station device 500 is reduced.

(Second Embodiment)

Next, a second embodiment of the present invention will be described. A mobile communication system according to the second embodiment includes a mobile station device 500 and a base station device 600, as described in the first embodiment. However, the second embodiment differs from the first embodiment in that the mobile station device 500 includes a reception device 100b (FIG. 13) instead of the reception device 100a (FIG. 1B). The second embodiment also differs from the first embodiment in that the base station device 600 includes a transmission device 400b (FIG. 14) instead of the transmission device 400a (FIG. 4).

In the second embodiment, when the base station device 600 transmits a response message to a gap request, the base station device 600 transmits CSG cell-related information to the mobile station device 500, in addition to gap information.

The base station device 600 searches for a CSG cell notified of through a gap request message, and generates information indicating gap permission or gap reject based on the search result.

In the case of the gap permission, the base station device 600 also generates information, such as optimal gap information to measure the CSG cell and update information for autonomous CSG cell detection. On the other hand, in the case of the gap reject, the base station device 600 generates information, such as gap reject reason information and update information for autonomous CSG cell detection.

The update information is information for correcting the autonomous detection in the mobile station device 500, such as a cell ID or GPS information of a neighboring cell corresponding to the CSG cell.

For example, the gap reject reason is (1) no cell detection, (2) no response from a cell, (3) no cell confirmation, (4) no mobility control, or (5) no scheduling.

Specifically, the gap is rejected (1) when the notified CSG cell is not deployed as a neighboring cell, (2) when there is no response from the CSG cell for a reason such as power-off or failure, (3) when the CSG cell cannot be searched for whatever reason, (4) when measurement is not required for a reason such as a great distance to the CSG cell, or (5) when a gap interval cannot be created due to high traffic. There may be other gap reject reasons.

The base station device 600 includes this information in the gap control message and transmits the gap control message to the mobile station device 500. The mobile station device 500 receives the gap control message and initiates proper control based on content of the gap control message.

Figure 13:
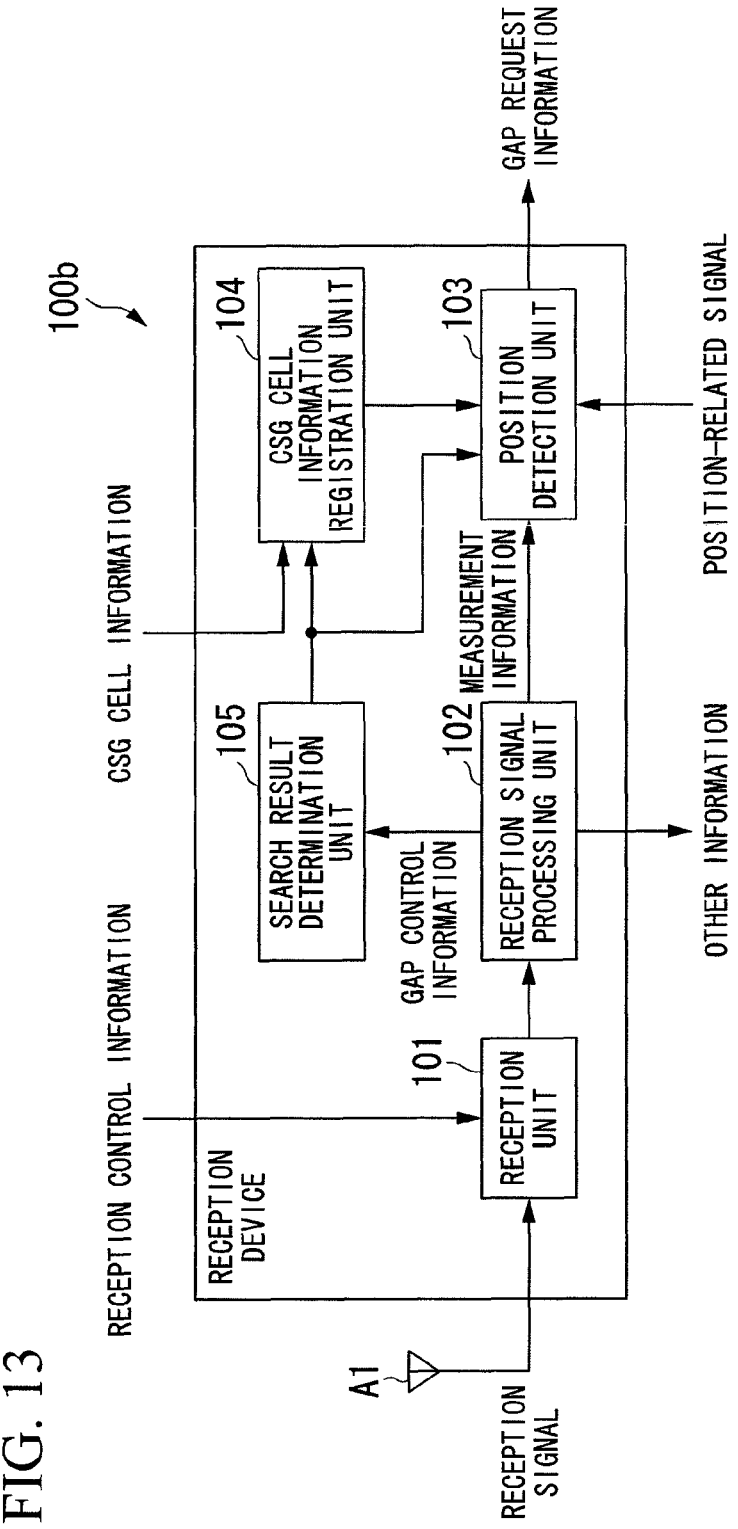
FIG. 13 is a block diagram illustrating an example of a reception device 100b in a mobile station device 500 according to a second embodiment of the present invention.

FIG. 13 is a block diagram illustrating an example of the reception device 100b of the mobile station device 500 according to the second embodiment of the present invention. The reception device 100b includes a reception unit 101, a reception signal processing unit 102, a position detection unit 103, a CSG cell information registration unit 104, a search result determination unit 105, and an antenna A1.

The same units of the reception device 100b as those of the reception device 100a (FIG. 1B) are assigned the same reference numerals and the description thereof will be omitted.

Since a process in the reception device 100b when the content of the reception signal is not a gap request response, i.e., a gap control message, is the same as that in FIG. 1B, the description thereof will be omitted.

The reception signal processing unit 102 having received the gap control message extracts the gap control information and outputs the gap control information to the search result determination unit 105.

For example, the gap control information is information indicating gap permission or gap reject, gap scheduling information, information (including the above-described update information and gap reject reasons) obtained as a result of the base station device 600 searching for neighboring cells based on the CSG cell information transmitted by the mobile station device 500, and so on.

The search result determination unit 105 outputs information for updating the registered CSG cell information to the CSG cell information registration unit 104 based on each information included in the gap control information, if necessary.

The search result determination unit 105 outputs additional information for generating gap request information to the position detection unit 103, if necessary.

When the update information for the registered information for specifying the CSG cell area (e.g., the cell ID or the GPS information of the neighboring cell) is input, the CSG cell information registration unit 104 updates the registered information.

The position detection unit 103 generates gap request information again according to the additional information. For example, when the response is the gap reject and the reject reason is no response from the cell, the position detection unit 103 generates gap request information after a predetermined time elapses.

The mobile station device 500 may be notified of the control parameter corresponding to the reject reason through the report information in advance, or the control parameter may be individually designated through a gap control message. The transmission device of the mobile station device 500 may have the same configuration as the transmission device 200a of FIG. 2.

Since other units of mobile station device 500 in FIG. 13 are not related to the present embodiment, the description thereof will be omitted.

Figure 14:
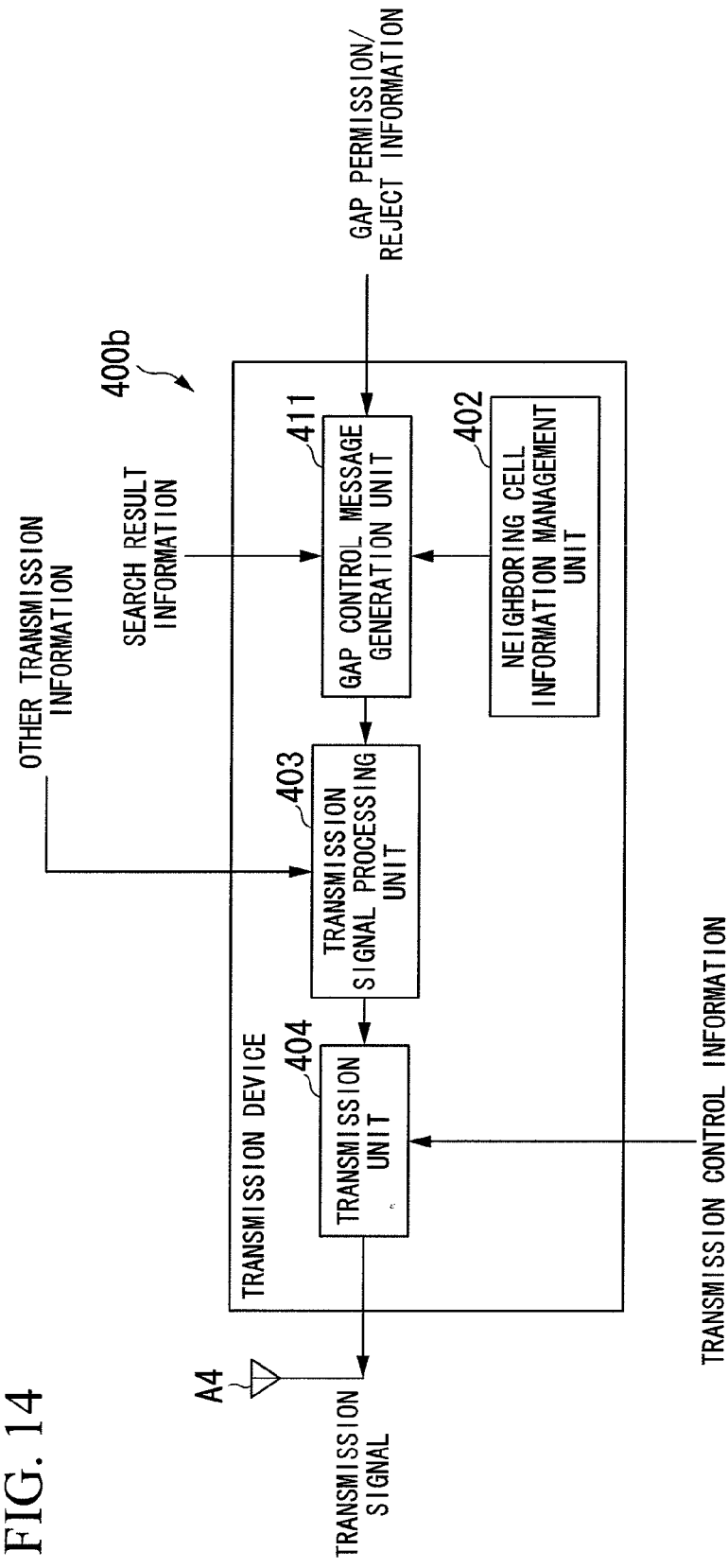
FIG. 14 is a schematic block diagram illustrating a configuration of a transmission device 400b in a base station device according to the second embodiment of the present invention.

FIG. 14 is a schematic block diagram illustrating a configuration of the transmission device 400b of the base station device 600 according to the second embodiment of the present invention. The transmission device 400b includes a gap control message generation unit 411, a neighboring cell information management unit 402, a transmission signal processing unit 403, a transmission unit 404, and an antenna A4.

The units of the transmission device 400b that are the same as those of the transmission device 400a (FIG. 4) in terms of a configuration are assigned the same reference numerals and the description thereof will be omitted.

The transmission device is the same as that in FIG. 4 except that search result information based on the gap request from the mobile station device 500 is input to the gap control message generation unit 411.

The search result information is information such as the above-described gap reject reason information or update information for autonomous CSG cell detection.

The gap control message generation unit 411 generates a gap control message based on the input gap permission/reject information and search result information and, if necessary, neighboring cell information from the neighboring cell information management unit 402. A subsequent process is the same as that in FIG. 4.

The reception device of the base station device 600 according to the second embodiment may have the same configuration as the reception device 300a of FIG. 3. Since the other units of the base station device 600 in FIG. 14 are not related to the present embodiment, the description thereof will be omitted.

Figure 15:
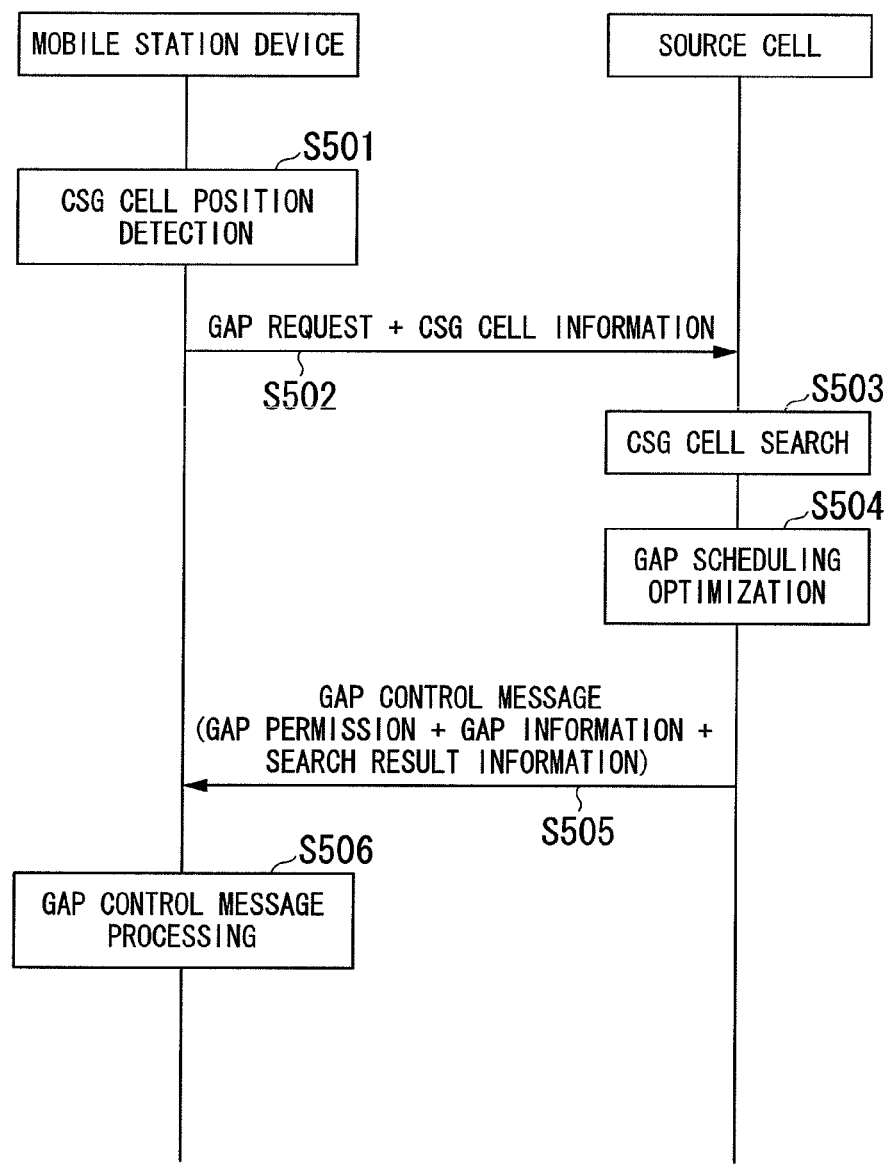
FIG. 15 is a sequence diagram illustrating a gap request process for CSG cell measurement in the second embodiment of the present invention.

FIG. 15 is a sequence diagram illustrating a gap request process for CSG cell measurement in the second embodiment of the present invention. As shown in FIG. 15, the mobile station device 500 is in communication with the base station device 600 of the source cell (in an active state).

In the sequence diagram of FIG. 15, the case where the gap request from the mobile station device 500 is permitted by the source cell is shown. A resource allocation process in transmission or reception and so on will be omitted.

Since a process (steps S501 to S503) in which the mobile station device 500 transmits a gap request and the source cell searches for a CSG cell based on the gap request is the same as the process in steps S301 to S303 in FIG. 5, the description thereof will be omitted.

When the CSG cell is deployed as a neighboring cell, the source cell performs optimal gap scheduling based on information of the result of searching for neighboring cells (step S504).

Optimal gap scheduling means setting a gap length, a gap number or the like to match a transmission timing of an SCH or a BCH of the CSG cell. Such a setting is performed by the source cell based on schedule information such as traffic or resource use efficiency, in addition to the CSG cell information.

The source cell includes information indicating gap permission, gap information indicating gap scheduling and, if necessary, search result information in the gap control message and transmits the gap control message to the mobile station device 500 (step S505).

The mobile station device 500 having received the gap control message updates the information on the CSG cell in which its own terminal has been registered according to indications in the content of the gap control message, if necessary, and initiates measurement of the CSG cell in which the terminal has been registered during an indicated gap interval (step S506). The processing in step S506 is referred to as gap control message processing.

Figure 16:
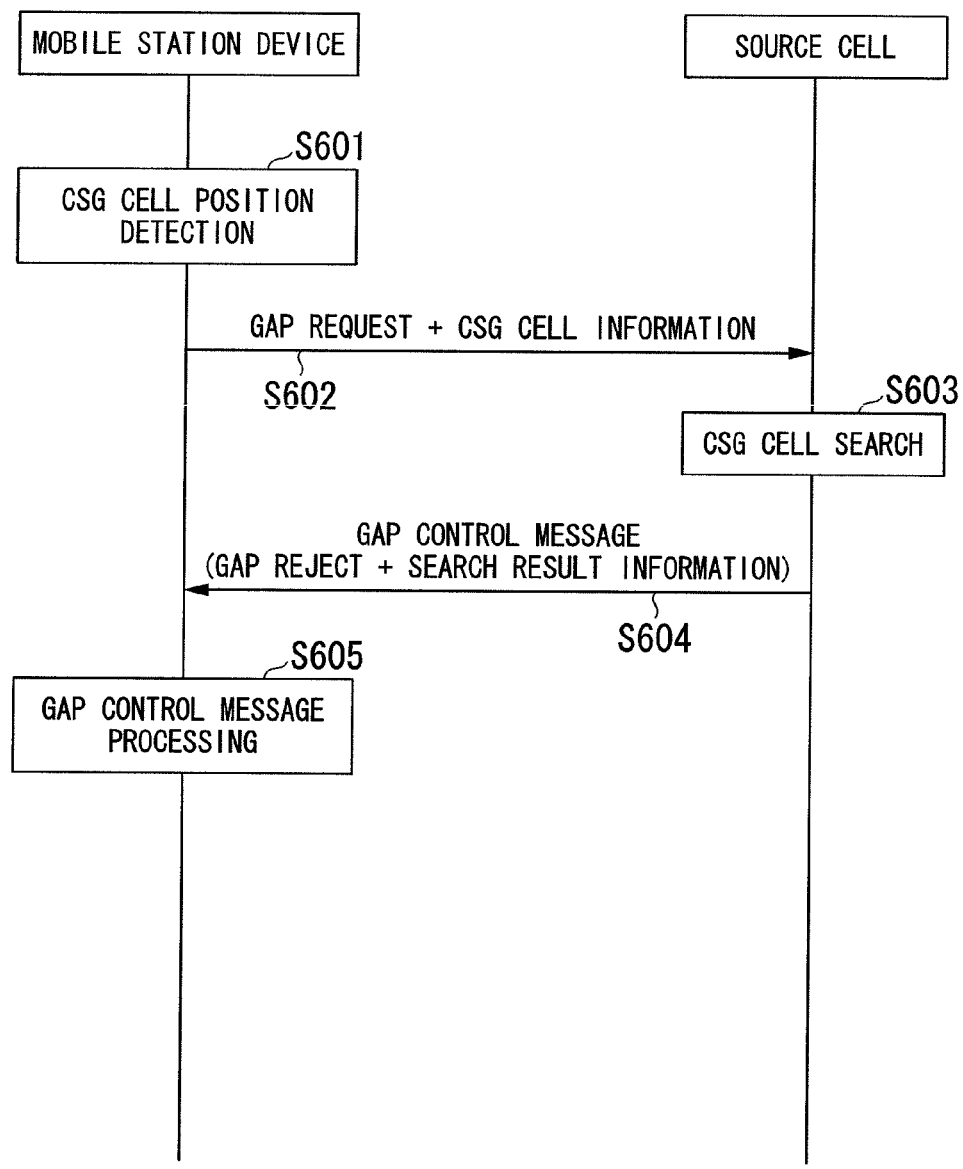
FIG. 16 is another sequence diagram illustrating a gap request process for CSG cell measurement in the second embodiment of the present invention.

FIG. 16 is another sequence diagram illustrating a gap request process for CSG cell measurement in the second embodiment of the present invention. As shown in FIG. 16, the mobile station device 500 is in communication with the base station device 600 of the source cell (in an active state).

In the sequence diagram of FIG. 16, the case where the gap request from the mobile station device 500 is rejected by the source cell is shown. A resource allocation process in transmission or reception and so on will be omitted.

Since a process (step S601, S602, S603) in which the mobile station device 500 transmits the gap request and the source cell searches for a CSG cell based on the gap request is the same as the process in steps S501, S502, and S503 of FIG. 15, the description thereof will be omitted.

When the source cell determines that the gap cannot be created for a reason such as that the CSG cell is not included in a neighboring cell, the source cell includes gap reject information and, if necessary, search result information in the gap control message and transmits the gap control message to the mobile station device 500 (step S604).

The mobile station device 500 having received the gap control message updates the information on the CSG cell in which its own terminal has been registered according to indications in the content of the message, if necessary. The mobile station device 500 recognizes that the gap request has been rejected, and continues to perform reception control according to current scheduling (step S605). The processing in step S604 is referred to as gap control message processing.

Figure 17:
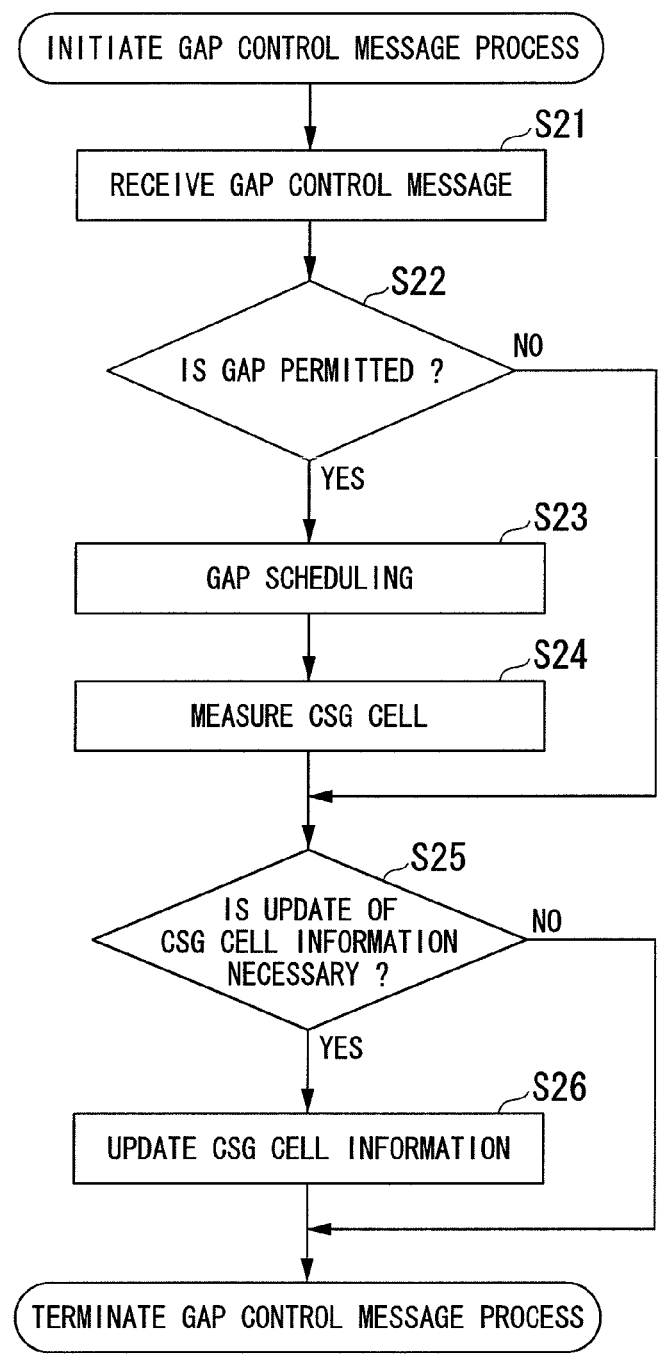
FIG. 17 is a flowchart illustrating a process after gap control message reception in the mobile station device 500 according to the second embodiment of the present invention.

FIG. 17 is a flowchart illustrating a process after gap control message reception in the mobile station device 500 according to the second embodiment of the present invention. Since a process in steps S21 to S24 is the same as that in FIG. 8, the steps are assigned the same reference numerals and the description thereof will be omitted.

After the mobile station device 500 performs the process in step S24 or when the gap has not been permitted in step S22, the mobile station device 500 performs the process in step S25. That is, the mobile station device 500 determines whether update information for the CSG cell is included in the gap control message or not (step S25).

When the update information is included in the gap control message, the mobile station device 500 updates the registered CSG cell information (step S26), and terminates the process of the flowchart shown in FIG. 17. When the update information is not included, the mobile station device 500 terminates the process of the flowchart in FIG. 17.

The flowchart of FIG. 17 is an example of the process in the mobile station device 500 and the present invention is not limited thereto. Other methods may be used as long as the methods allow the mobile station device 500 to acquire the CSG cell search result information from the base station device 600 and update the information on the CSG cell in which its own terminal has been registered.

Figure 18:
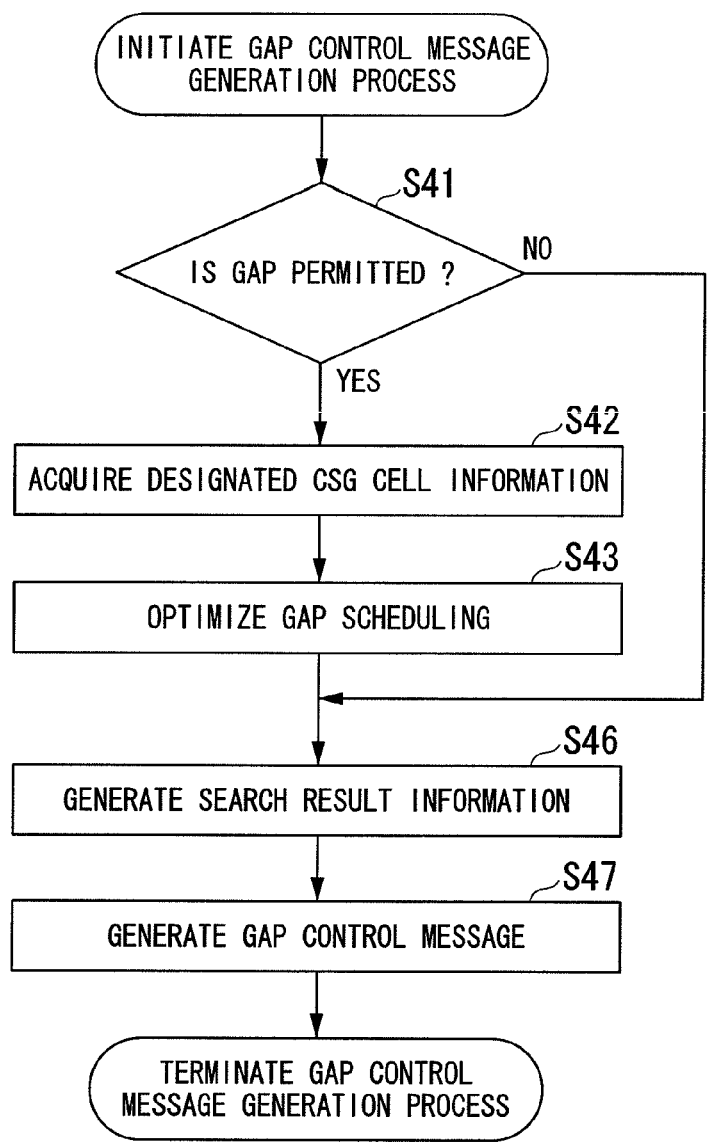
FIG. 18 is a flowchart illustrating a gap control message generation process in the base station device according to the second embodiment of the present invention.

FIG. 18 is a flowchart illustrating a gap control message generation process in the base station device 600 according to the second embodiment of the present invention. Since a process in steps S41 to S43 is the same as shown in FIG. 10, the steps are assigned the same reference numerals and the description thereof will be omitted.

After the process in step S43 is performed or the gap has been rejected in step S41, the base station device 600 performs a process in step S46. That is, the base station device 600 generates required search result information based on the gap request determination result and the designated CSG cell search result (step S46).

The base station device 600 generates a gap control message including the search result information and the gap scheduling information of step S43 when the gap has been permitted (step S47).

The flowchart of FIG. 18 is an example of the process in the base station device 600 and the present invention is not limited thereto. Other processes may be used as long as the processes allow the mobile station device 500 to transmit a message including search result information for the designated CSG cell and the determination result of the gap request based on the search result to the mobile station device 500.

Figure 19:
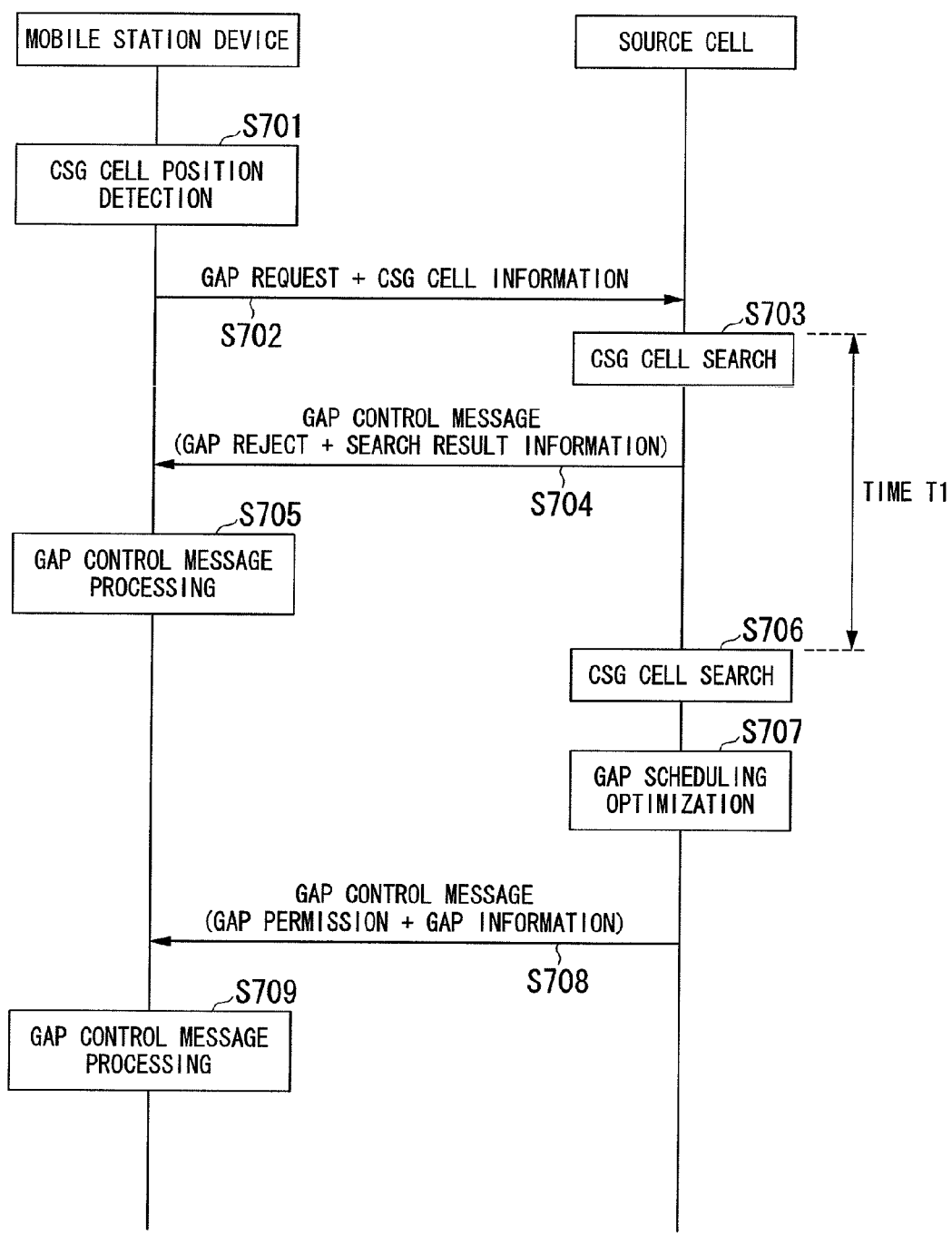
FIG. 19 is a sequence diagram illustrating a process in which the base station device continues to perform searching when a CSG cell is not detected after receiving a gap request according to the second embodiment of the present invention.

FIG. 19 is a sequence diagram illustrating a process in which the base station device 600 continues to perform searching when the CSG cell is not detected after receiving a gap request according to the second embodiment of the present invention.

The process shown in FIG. 19 is effective, for example, when the CSG cell is powered on again. In FIG. 19, respective processes and most messages are the same as those in FIG. 15 or FIG. 16.

First, the mobile station device 500 detects that its own terminal is located in an area of the CSG cell in which the terminal has been registered (step S701).

The mobile station device 500 having detected that the terminal is located in the CSG cell area and requiring a gap for the CSG cell measurement transmits a gap request message including gap request information and CSG cell information to the base station device 600 of the source cell (step S702).

The base station device 600 of the source cell searches for the designated CSG cell from neighboring cells (step S703).

When rejecting the gap, the base station device 600 of the source cell transmits a gap control message including gap reject and, if necessary, search result information to the mobile station device 500 (step S704).

The mobile station device 500 having received the gap control message processes the gap control message (step S705).

Meanwhile, when the base station device 600 of the source cell has rejected the gap, the base station device 600 continues to search for the CSG cell in a period of a time T1 (step S706).

When permitting the gap, the base station device 600 of the source cell optimizes gap scheduling (step S707).

The base station device 600 of the source cell transmits a gap control message including gap permission and gap information to the mobile station device 500 (step S708).

The mobile station device 500 performs the gap control message process (step S709).

Here, when the base station device 600 of the source cell determines the gap reject as a result of executing the CSG cell search, the base station device 600 activates a timer to count a predetermined time T1 (step S703).

A length of the time T1 may be a fixed value or may be changed based on, for example, a gap reject reason or traffic.

When the time T1 has expired, the base station device 600 searches for the CSG cell notified of from the mobile station device 500 again (step S706). While in FIG. 19, the case where the CSG cell has been detected in the CSG cell search in step S706 is shown, the base station device 600 activates the timer again when the CSG is not detected, and iteratively performs the same process.

When the timer is activated again, the expiration time of the timer may differ from T1. For example, the expiration time may be extended by a predetermined time according to the detection execution number. Alternatively, the time T1 may be increased n times (e.g., n=2, 3, . . . ) according to the detection execution number.

When the CSG cell is detected or when the mobile station device 500 moves to a cell other than the source cell, the timer stops, and when the expiration time of the timer is changed, the timer returns to a predetermined initial value. When the CSG cell is not detected after a predetermined time has elapses, the timer stops or the CSG cell continues to be searched at a low frequency, such as once every few hours.

Through the process shown in FIG. 19, the mobile station device 500 is notified of the gap information at a time when the CSG cell measurement becomes possible, thus suppressing useless measurement and executing more optimal measurement control.

According to the present embodiment, the base station device 600 may include the update information for the CSG cell of the mobile station device 500 in a response message to the gap request from the mobile station device 500.

In the case of the gap reject, a reason for the reject can be notified of. Using this information, the mobile station device 500 can properly perform subsequent measurement control.

According to the present embodiment, the following effects are obtained in addition to the effect of the first embodiment. That is, the base station device 600 can include the search result information (the update information, the gap reject reason, and so on) for the CSG cell of the mobile station device 500 in the response message to the gap request. The mobile station device 500 updates the information on the CSG cell in which its own terminal has been registered in consideration of the search result information, thus improving accuracy of subsequent CSG cell detection and measurement efficiency.

(Third Embodiment)

Next, a third embodiment of the present invention will be described. A mobile communication system according to the third embodiment includes a mobile station device 500 and a base station device 600, as described in the first embodiment.

However, the third embodiment differs from the first embodiment in that the mobile station device 500 includes a reception device 100c (FIG. 20) instead of the reception device 100a (FIG. 1B). The third embodiment also differs from the first embodiment in that the mobile station device 500 includes a transmission device 200c (FIG. 21) instead of the transmission device 200a (FIG. 2).

The third embodiment also differs from the first embodiment in that the base station device 600 includes a reception device 300c (FIG. 22) instead of the reception device 300a (FIG. 3). The third embodiment also differs from the first embodiment in that the base station device 600 includes a transmission device 400c (FIG. 23) instead of the transmission device 400a (FIG. 4).

In the third embodiment, when the CSG cell is not detected despite the mobile station device 500 attempting to detect the CSG cell for a predetermined time or a predetermined number of times upon CSG cell measurement, the mobile station device 500 transmits CSG cell information to the base station device 600. The base station device 600 searches for the CSG cell.

As described above, the mobile station device 500 determines through autonomous detection that its own terminal enters the CSG cell area in which the terminal has been registered. When the CSG cell in which the terminal has been registered can be measured without the gap interval, for example, due to discontinuous reception or an idle state, the mobile station device 500 attempts to detect the CSG cell at arbitrary timing.

However, when the autonomous CSG cell area detection is erroneous or even when the autonomous CSG cell area detection is correct, the CSG cell area may not be detected for a reason such as CSG cell redeployment or power-off. Further, when the base station device 600 permits gap creation without confirming whether the CSG cell of the mobile station device 500 is located as a neighboring cell or not, even in measuring the CSG during the gap interval in communication, the CSG cell may not be detected for the same reason.

Here, when the CSG cell in which the terminal has been registered is not detected even through detection executions for a predetermined time or a predetermined number of times, the mobile station device 500 transmits a search request to the base station device 600 to determine whether the CSG cell in which the terminal has been registered is located as a neighboring cell or not, or to ask whether the autonomous detection result is corrected or not.

The base station device 600 searches for neighboring cells based on the CSG cell information of the mobile station device 500 included in the search request, and acquires search result information for the presence or absence or the state of the CSG cell. Update information or reasons of no detection are included in the search result information.

The update information is information for correcting the autonomous detection in the mobile station device 500, such as a cell ID or GPS information of a neighboring cell corresponding to the CSG cell.

The reasons of no detection are information on a state of the CSG cell, such as (1) no cell detection, (2) no response from the cell, and (3) no cell confirmation. These are the same as the gap reject reasons in the second embodiment. There may be other reasons of no detection.

The base station device 600 includes this information in a measurement control message and transmits the measurement control message to the mobile station device 500. The mobile station device 500 receives the measurement control message and initiates proper control based on the content of the measurement control message.

Figure 20:
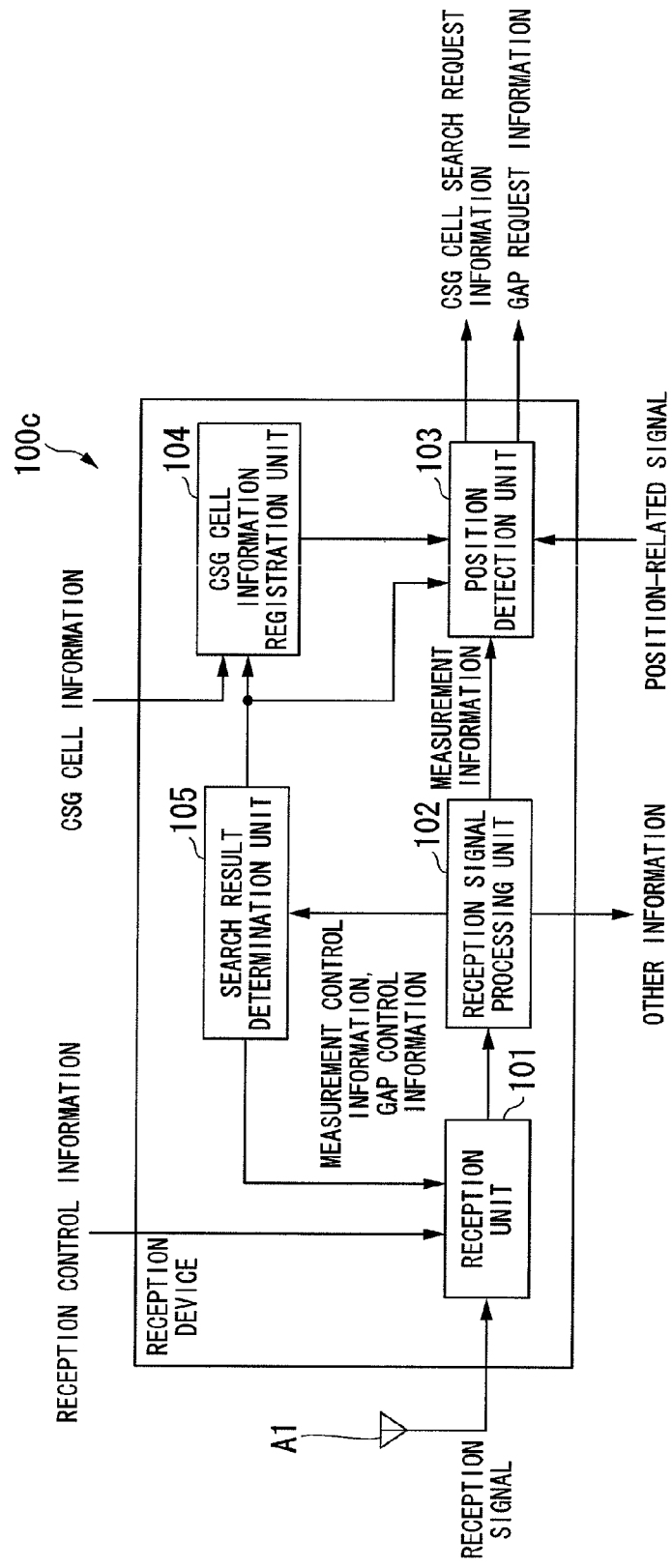
FIG. 20 is a schematic block diagram illustrating a configuration of a reception device 100c in a mobile station device 500 according to a third embodiment of the present invention.

FIG. 20 is a schematic block diagram illustrating a configuration of the reception device 100c in the mobile station device 500 according to the third embodiment of the present invention. The reception device 100c includes a reception unit 101, a reception signal processing unit 102, a position detection unit 103, a CSG cell information registration unit 104, and a search result determination unit 105.

The units of the reception device 100c that are the same as those of the reception device 100a (FIG. 1B) in terms of a configuration are assigned the same reference numerals and the description thereof will be omitted.

Since the determination in the reception device 100c as to whether the terminal has entered the communication area of the CSG cell or not is the same as described in the first embodiment of FIG. 1B, the description thereof will be omitted.

Similarly, since a process when the gap control message is received is the same as the process described in the second embodiment of FIG. 13, the description thereof will be omitted.

As described in FIG. 1B, when it is determined that the terminal enters the communication area of the CSG cell in which the terminal has been registered and the CSG cell can be measured without the gap interval, or when the CSG cell is measured based on the gap information_provided from the base station device 600 as a response message to the gap request, the CSG cell measurement result from the reception signal processing unit 102 is input as measurement information to the position detection unit 103.

Here, when the SCH of the CSG cell included in the measurement information is not detected or when the reception quality of the downlink reference signal is in a very low level, it is determined that the CSG cell measurement has failed.

When the measurement failure continues for a predetermined time, when detection failure is repeated continuously a predetermined number of times, or when an available time of the gap interval expires, the position detection unit 103 outputs CSG cell search request information. When the reception signal is a measurement control message, the reception signal processing unit 102 acquires the measurement control information from the message and outputs the measurement control information to the search result determination unit 105.

The search result determination unit 105 outputs information for updating the registered CSG cell information based on each information included in the measurement control information to the CSG cell information registration unit 104, if necessary. When the update information for the registered information for specifying the CSG cell area is input, the CSG cell information registration unit 104 updates the registered information. The registered information includes a cell ID or GPS information of a neighboring cell and so on.

The search result determination unit 105 outputs re-measurement information for CSG cell measurement to the reception unit 101, if necessary.

The reception unit 101 performs re-measurement of the CSG cell according to the re-measurement information. For example, when the CSG cell is not detected and the reason of no detection is no response from the cell, the reception unit 101 attempts re-measurement after a predetermined time has elapses. When the reason is no cell detection, the reception unit 101 stops the measurement and attempts the process of searching for the area of the CSG cell in which its own terminal has been registered.

The mobile station device 500 may be notified of the control parameter corresponding to the reason of no detection through the report information in advance, or the control parameter may be individually designated through a gap control message.

Figure 21:
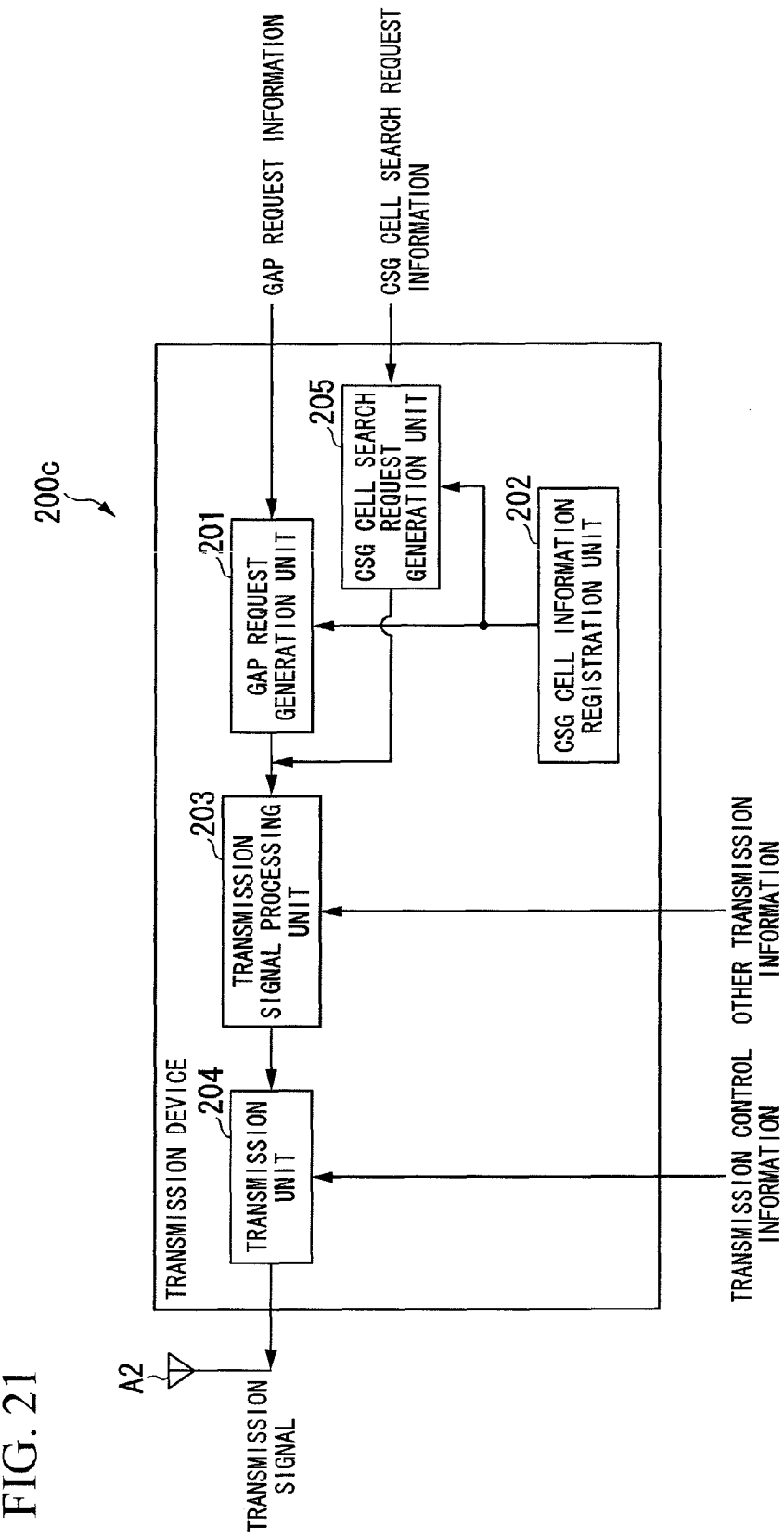
FIG. 21 is a schematic block diagram illustrating a configuration of a transmission device 200c in the mobile station device 500 according to the third embodiment of the present invention.

FIG. 21 is a schematic block diagram illustrating a configuration of the transmission device 200c of the mobile station device 500 according to the third embodiment of the present invention. The transmission device 200c includes a gap request generation unit 201, a CSG cell information registration unit 202, a transmission signal processing unit 203, a transmission unit 204, a CSG cell search request generation unit 205, and an antenna A2.

The units of the transmission device 200c that are the same as those of the transmission device 200a (FIG. 2) in terms of a configuration are assigned the same reference numerals and the description thereof will be omitted.

Since a process when the gap request information generated by the position detection unit 103 in FIG. 20 is input to the transmission device 200c is the same as that in the first embodiment of FIG. 2, the description thereof will be omitted.

The CSG cell search request information generated by the position detection unit 103 of FIG. 20 is input to the CSG cell search request generation unit 205.

The CSG cell search request generation unit 205 acquires the information on the CSG cell in which the own terminal has been registered from the CSG cell information registration unit 202, generates a CSG cell search request message including the CSG cell information, and outputs the CSG cell search request message to the transmission signal processing unit 203. The information on the CSG cell in which the own terminal has been registered may be acquired from the CSG cell information registration unit 104 of FIG. 20 when the CSG cell information registration unit 202 is not provided in the mobile station device 500.

The transmission signal processing unit 203 performs proper scheduling on the CSG cell search request message from the CSG cell search request generation unit 205, the gap request signal from the gap request generation unit 201, and other transmission signals.

The data output based on the scheduling in the transmission signal processing unit 203 is output as a transmission signal by the transmission unit 204 via the antenna A2 according to the transmission control information.

Since the other units of the mobile station device 500 in FIGS. 20 and 21 are not related to the present embodiment, the description thereof will be omitted.

Figure 22:
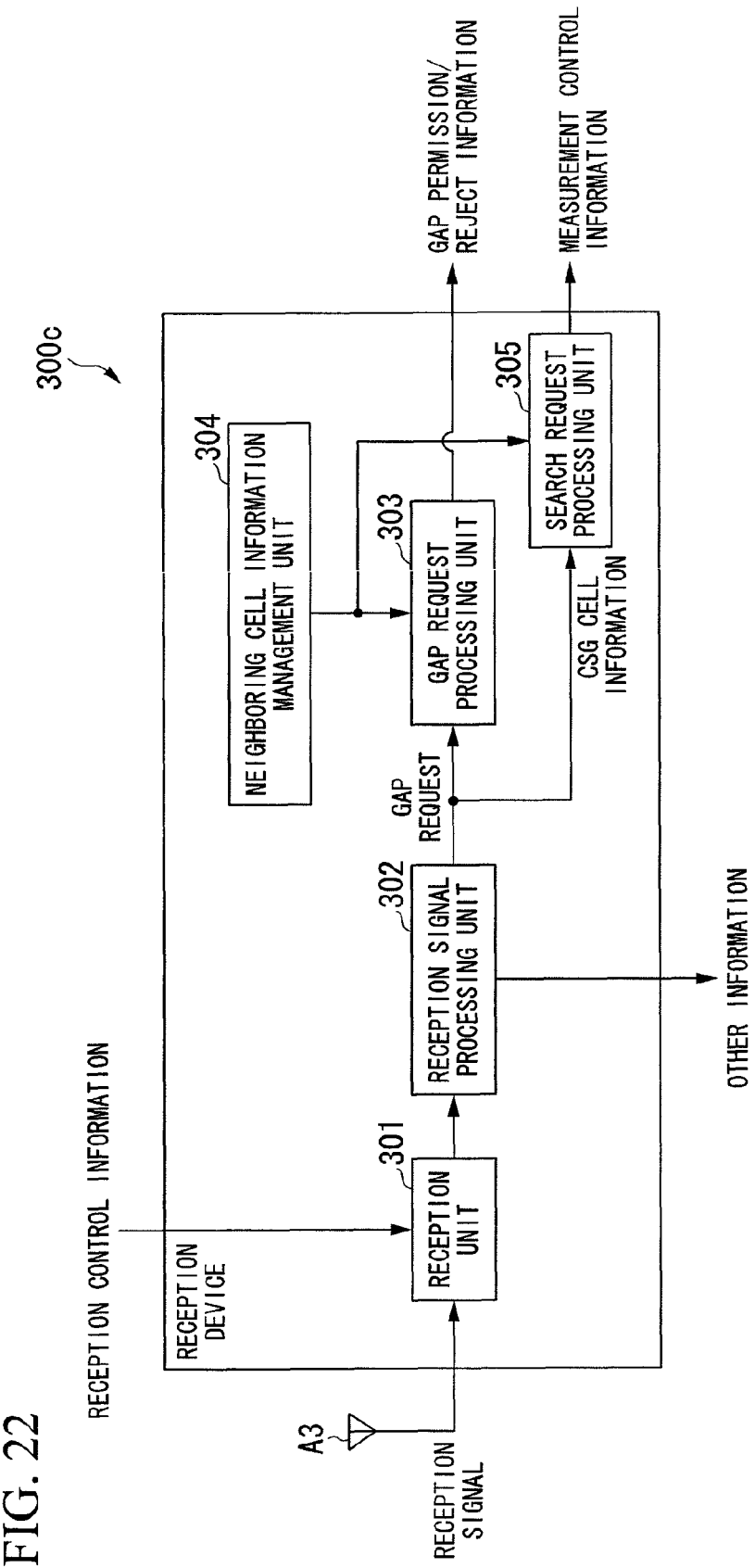
FIG. 22 is a schematic block diagram illustrating a configuration of a reception device 300c in a base station device according to the third embodiment of the present invention.

FIG. 22 is a schematic block diagram illustrating a configuration of the reception device 300c in the base station device 600 according to the third embodiment of the present invention. The reception device 300c includes a reception unit 301, a reception signal processing unit 302, a gap request processing unit 303, a neighboring cell information management unit 304, a search request processing unit 305, and an antenna A3.

The units of the reception device 300c that are the same as those of the reception device 300a (FIG. 3) in terms of a configuration are assigned the same reference numerals and the description thereof will be omitted.

Since a process in the reception device 300c when the reception signal is the gap request message is the same as in the first embodiment of FIG. 3, the description thereof will be omitted. When the reception signal is a CSG cell search request message, the reception signal processing unit 302 extracts the CSG cell information from the gap request message and outputs the CSG cell information to the search request processing unit 305. The neighboring cell information from the neighboring cell information management unit 304 is input to the search request processing unit 305.

The search request processing unit 305 outputs measurement control information to the mobile station device 500 based on the CSG cell information and the neighboring cell information. The measurement control information includes information for instructing the mobile station device 500 to measure the CSG cell.

For example, when information of the CSG cell notified of from the mobile station device 500 is included in the neighboring cell information, the search request processing unit 305 instructs the mobile station device 500 to continuously perform the same measurement. On the other hand, when the information of the CSG cell is not included, the search request processing unit 305 instructs the mobile station device 500 to stop the measurement. When modification of the CSG cell information is necessary, the search request processing unit 305 instructs the mobile station device 500 to set the CSG cell information again.

Figure 23:
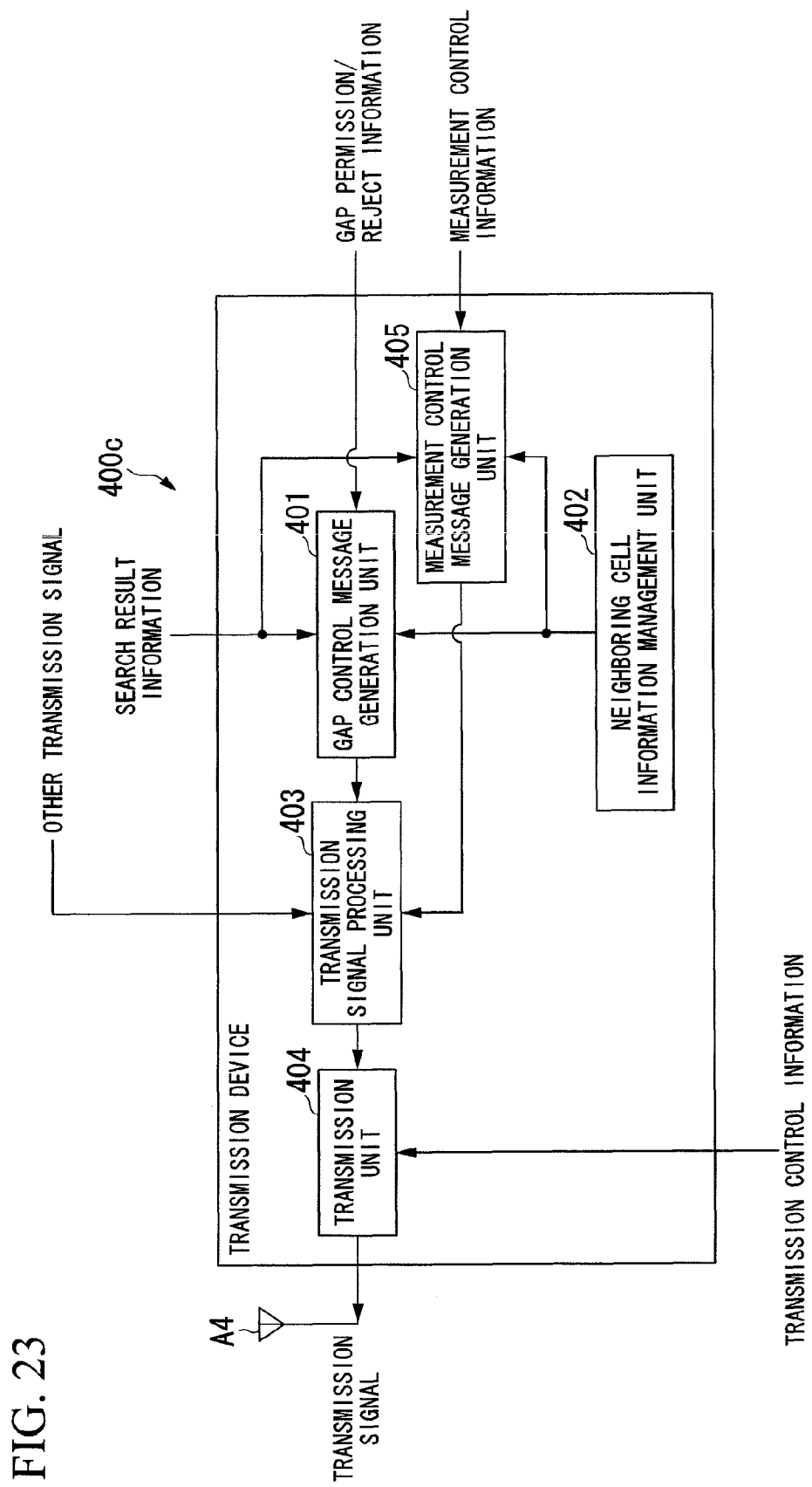
FIG. 23 is schematic block diagram illustrating a configuration of a transmission device 400c in the base station device according to the third embodiment of the present invention.

FIG. 23 is schematic block diagram illustrating a configuration of the transmission device 400c in the base station device 600 according to the third embodiment of the present invention. The transmission device 400c includes a gap control message generation unit 401, a neighboring cell information management unit 402, a transmission signal processing unit 403, a transmission unit 404, a measurement control message generation unit 405, and an antenna A4.

The units of the transmission device 400c that are the same as those of the transmission device 400a (FIG. 4) in terms of a configuration are assigned the same reference numerals and the description thereof will be omitted.

Since a process when the gap permission/reject information generated by the gap request processing unit 303 in FIG. 22 is input to the transmission device 400c is the same as the first embodiment in FIG. 4, the description thereof will be omitted.

The measurement control information generated by the search request processing unit 305 in FIG. 22 is input to the measurement control message generation unit 405.

The measurement control message generation unit 405 generates a measurement control message based on the input measurement control information, the search result information and, if necessary, neighboring cell information from the neighboring cell information management unit 402.

When measurement stop is instructed through the measurement control information, the measurement control message generation unit 405 generates a measurement control stop message. When continuation of the measurement using current parameters is instructed, the measurement control message generation unit 405 does not perform the process. When setting the CSG cell information again is instructed, the measurement control message generation unit 405 acquires required information from the search result information and the neighboring cell information and includes the required information in the measurement control message.

The transmission signal processing unit 403 performs proper scheduling on a gap control message from the gap control message generation unit 401, the measurement control message from the measurement control message generation unit 405, and other transmission signals.

Data output based on the scheduling in the transmission signal processing unit 403 is output as a transmission signal by the transmission unit 404 via the antenna A4 according to the transmission control information.

Since the other units of the base station device 600 in FIGS. 22 and 23 are not related to the present embodiment, the description thereof will be omitted.

Figure 24:
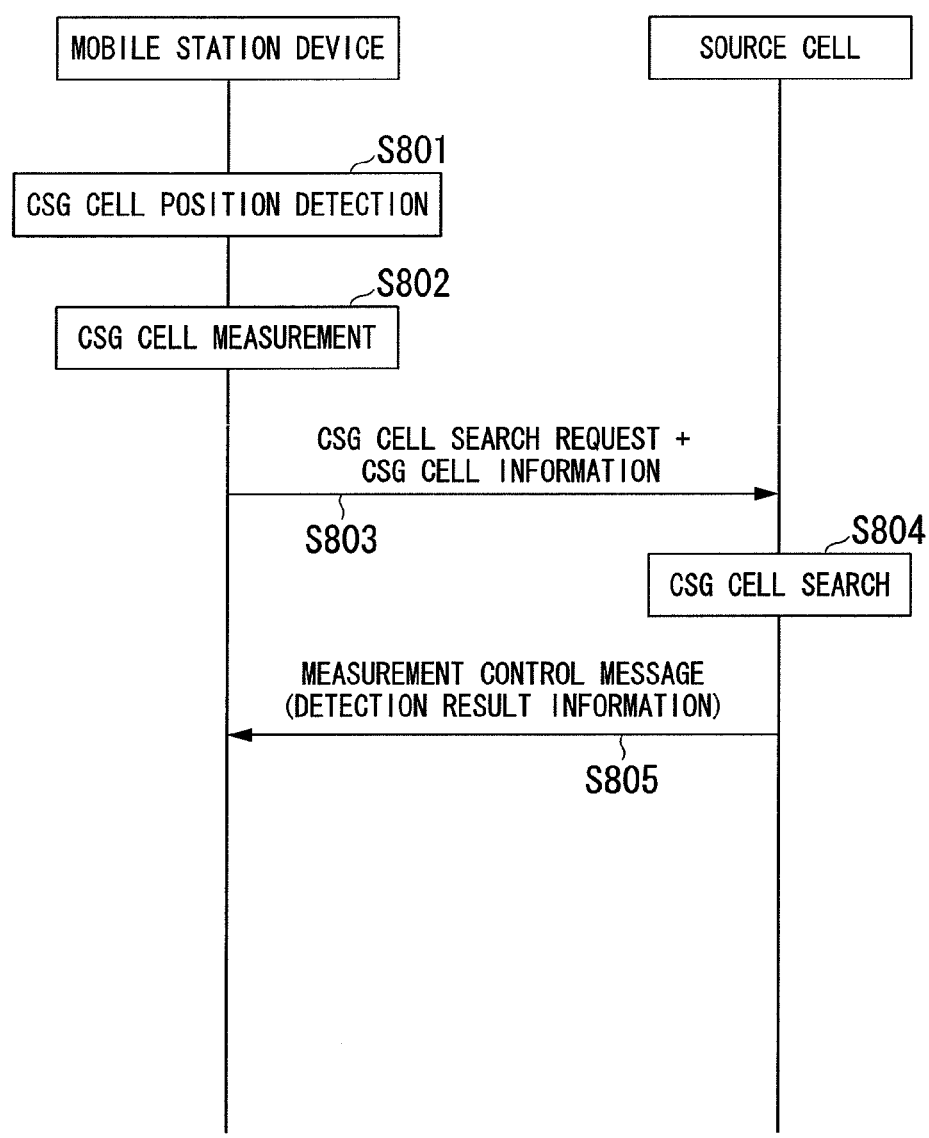
FIG. 24 is a sequence diagram illustrating a CSG cell search request process for requesting CSG cell measurement according to the third embodiment of the present invention.

FIG. 24 is a sequence diagram illustrating a CSG cell search request process for requesting CSG cell measurement according to the third embodiment of the present invention. Here, the case where a gap is unnecessary for the mobile station device 500 to measure the CSG cell will be described. The description of a resource allocation process in transmission or reception and so on will be omitted.

First, the mobile station device 500 detects that its own terminal is located in an area of a CSG cell in which the terminal has been registered (step S801).

The mobile station device 500 having detected that the terminal is in the CSG cell area initiates the CSG cell measurement at arbitrary timing (step S802).

Here, when the CSG cell measurement result is no detection of the SCH or indicates that only low-level reception quality is obtained and the same measurement result is continued for a predetermined time or a predetermined number of times, the mobile station device 500 generates a CSG cell search request message. The mobile station device 500 includes at least one corresponding CSG cell information in the CSG cell search request message and transmits the CSG cell search request message to the base station device 600 of the source cell (step S803).

When receiving the CSG cell search request message, the base station device 600 of the source cell searches for the designated CSG cell to determine whether the CSG cell is deployed as a neighboring cell of the source cell or not (step S804).

Here, the neighboring cell includes a cell using a different frequency or communication system from the source cell. The CSG cell may be searched from the neighboring cell information stored in the base station device 600, or the base station device 600 may ask neighboring base station devices 600 about presence of the cell.

The base station device 600 of the source cell generates a measurement control message including a series of information (search result information), such as the CSG cell search result and, if necessary, update information for the CSG cell or reasons of no detection, and transmits the measurement control message to the mobile station device 500 (step S805).

The mobile station device 500 having received the measurement control message determines a subsequent CSG cell measurement control according to the content of the message.

Figure 25:
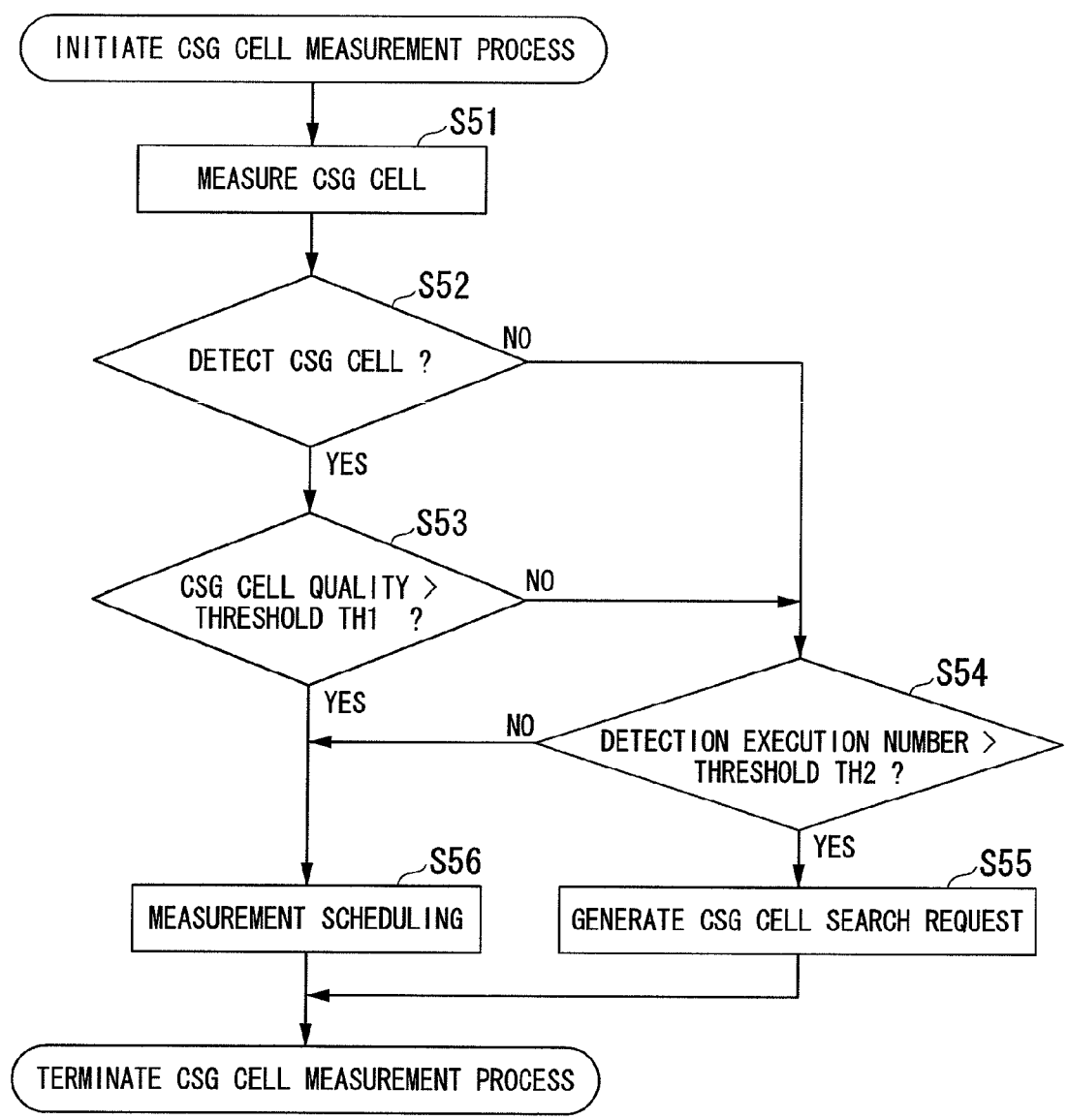
FIG. 25 is a flowchart illustrating a CSG cell measurement process in a mobile station device 500 according to the third embodiment of the present invention.
Figure 26:
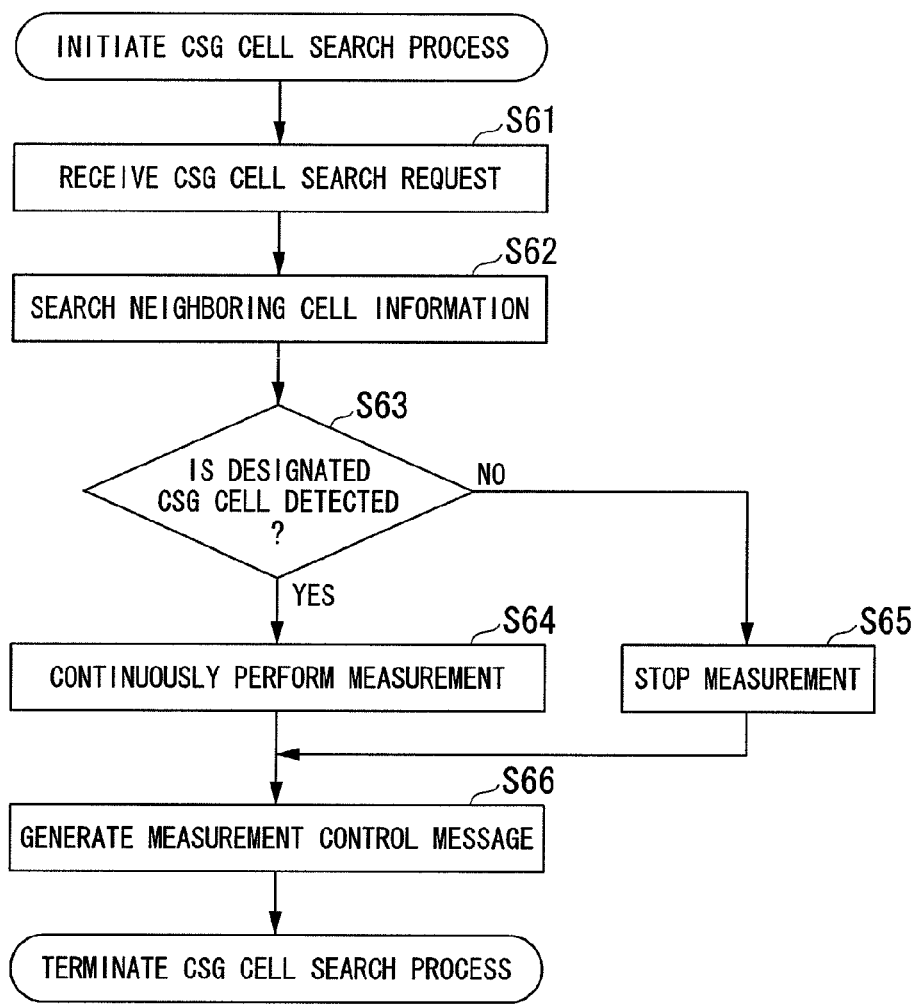
FIG. 26 is a flowchart illustrating a CSG cell search process after CSG cell search request message reception in the base station device according to the third embodiment of the present invention.

The CSG cell measurement process in the mobile station device 500 and the CSG cell search process in the base station device 600 in FIG. 24 are shown in detail in FIGS. 25 and 26.

FIG. 25 is a flowchart illustrating the CSG cell measurement process in the mobile station device 500 according to the third embodiment of the present invention.

The mobile station device 500 determines that a cell area is the CSG cell area, determines a CSG cell measurement schedule, and performs the measurement according to the measurement schedule (step S51).

After the measurement, the mobile station device 500 determines whether the SCH of the CSG cell is detected or not (step S52). When the SCH of the CSG cell is detected, the mobile station device 500 measures the reception quality of the downlink reference signal and determines whether the reception quality is greater than a predetermined threshold TH1 or not (step S53).

When the SCH of the CSG cell is detected and the reception quality of the downlink reference signal is greater than the threshold TH1, the mobile station device 500 determines a next measurement execution schedule (step S56), and terminates the measurement process.

When the SCH is not detected or the reception quality of the downlink reference signal is equal to or smaller than the threshold TH1, the mobile station device 500 counts the number of search executions. The mobile station device 500 determines whether the search execution number exceeds a predetermined threshold TH2 or not (step S54).

When the search execution number does not exceed the threshold TH2, the mobile station device 500 determines a next measurement execution schedule (step S56) and terminates the measurement process. On the other hand, when the search execution number is equal to or greater than the threshold TH2, the mobile station device 500 performs a CSG cell search request generation process (step S55).

A measurement time may be used instead of the execution number. For example, when the CSG cell measurement is initiated and then the CSG cell is not detected in a predetermined time, the mobile station device 500 may generate a CSG cell search request. In the CSG cell search request generation process, the mobile station device 500 sets the CSG cell information, which the source cell will be notified of, in the CSG cell search request message. The thresholds TH1 and TH2 are acquired from the report information or uniquely determined in the mobile communication system.

The flowchart of FIG. 25 is an example of the process in the mobile station device 500 and the present invention is not limited thereto. Other processes may be performed as long as the processes allow the mobile station device 500 to notify the base station device 600 of the information on the CSG cell in which its own terminal has been registered, when the CSG cell is not detected.

FIG. 26 is a flowchart illustrating the CSG cell search process after CSG cell search request message reception in the base station device 600 according to the third embodiment of the present invention.

When the base station device 600 of the source cell receives the CSG cell search request message, the base station device 600 performs the CSG cell search request reception process (step S61). Accordingly, the base station device 600 acquires the CSG cell information included in the CSG cell search request message.

Subsequently, the base station device 600 searches for the CSG cell information to determine whether the CSG cell information is included in the neighboring cell information or not (step S62). The neighboring cell information may be stored in the base station device 600 of the source cell in advance, or may be obtained from the result of searching for neighboring cells after the message reception.

The base station device 600 determines whether information of the CSG cell designated by the mobile station device 500 is included in the neighboring cell information or not (step S63). When the information of the CSG cell designated by the mobile station device 500 is included in the neighboring cell information, the base station device 600 determines that the measurement may be continuously performed (step S64). On the other hand, when the information of the CSG cell designated by the mobile station device 500 is not included in the neighboring cell information, the base station device 600 determines measurement stop (step S65).

The base station device 600 generates a measurement control message including the determination result of measurement continuation or measurement stop and, if necessary, the CSG cell search result (step S66) and terminates the process of the flowchart of FIG. 26.

The flowchart of FIG. 26 is an example of the process in the base station device 600 and the present invention is not limited thereto. Other processes may be performed if the processes allow the mobile station device 500 to transmit a message including an instruction for subsequent control of measurement of the CSG cell of the mobile station device 500 and the search result information to the mobile station device 500 based on the result of searching for the CSG cell.

Figure 27:
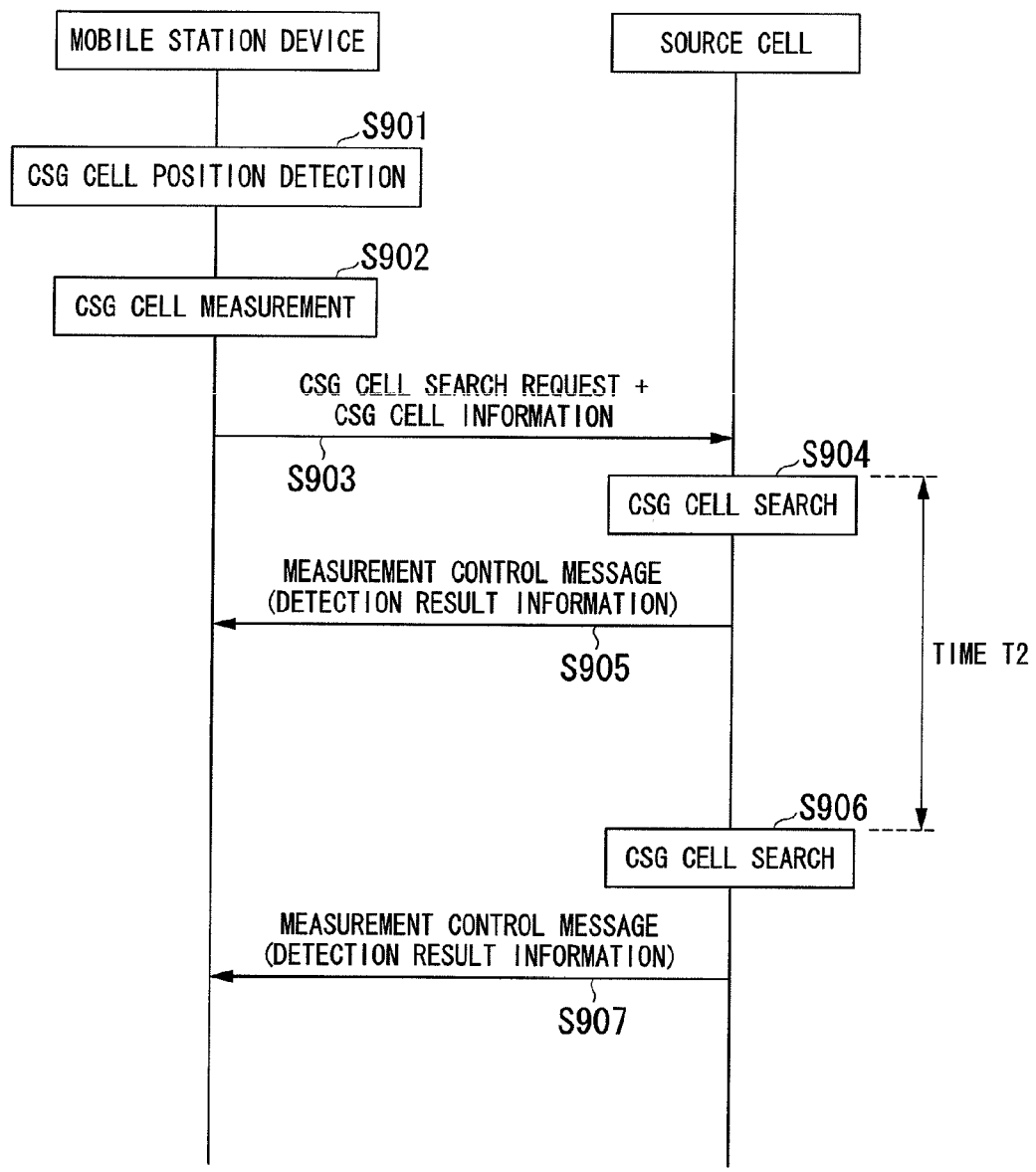
FIG. 27 is a sequence diagram illustrating a process in which the base station device continues to perform searching when a CSG cell is not detected after receiving a gap request according to the third embodiment of the present invention.
Figure 28:
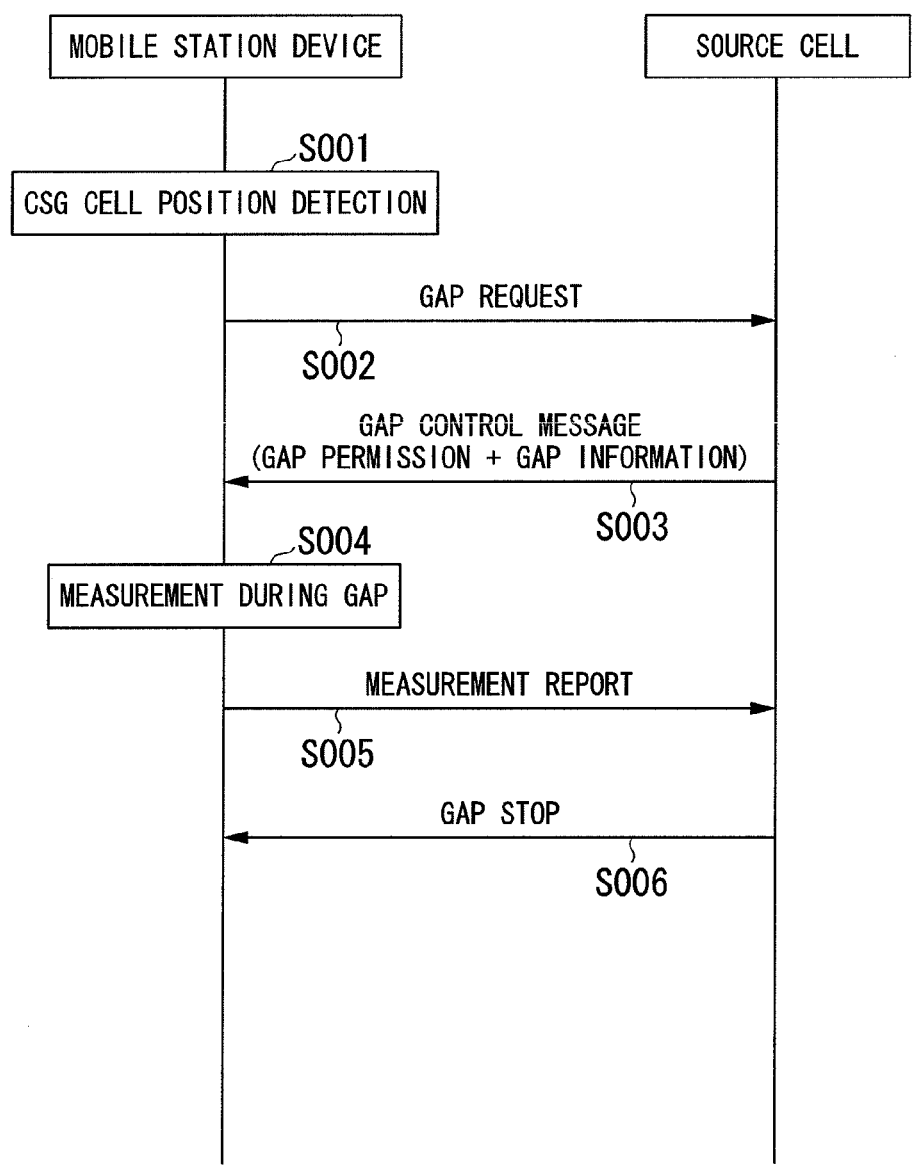
FIG. 28 is a sequence diagram illustrating a process in which a mobile station device requests a base station device to create a gap for CSG cell measurement.
Figure 29:
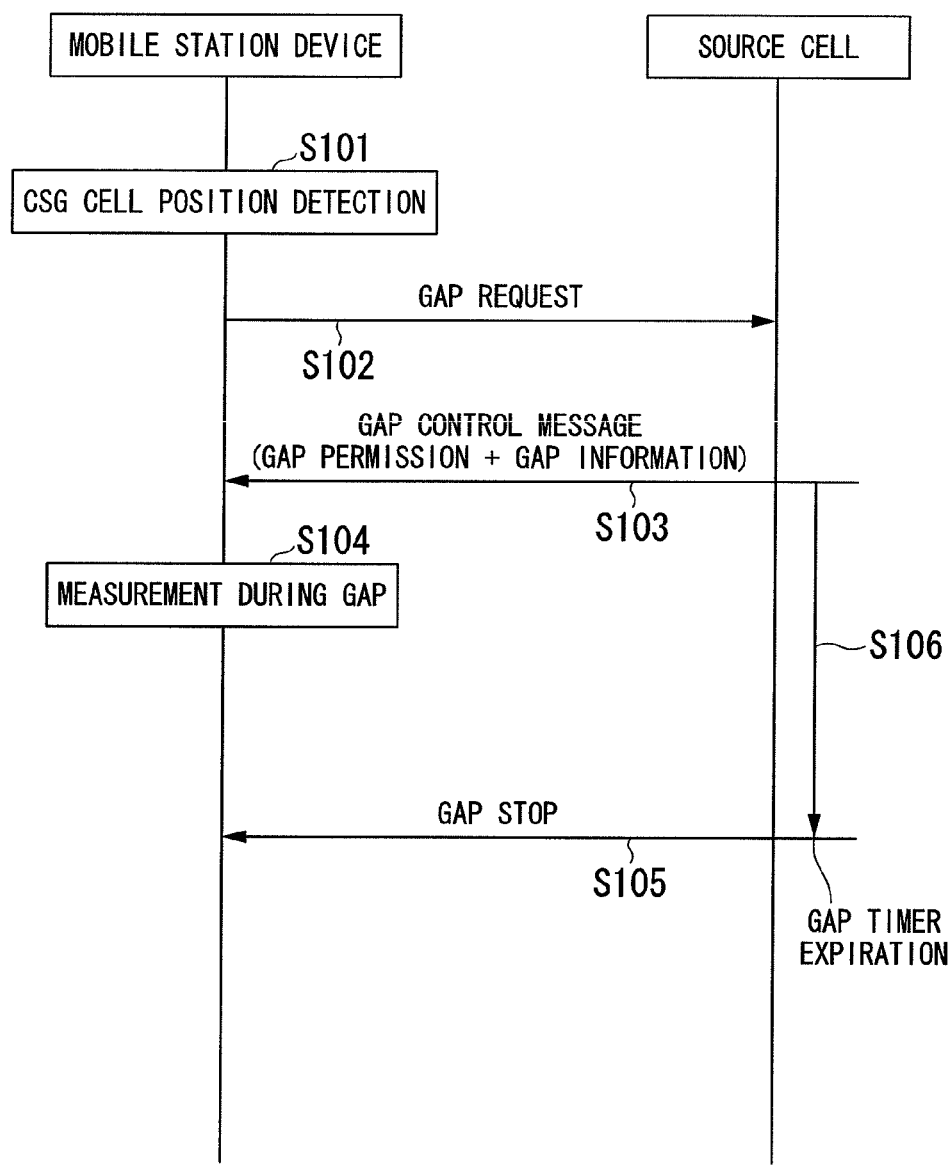
FIG. 29 is a sequence diagram illustrating another process in which the mobile station device requests the base station device to create the gap for CSG cell measurement.

FIG. 27 is a sequence diagram illustrating a process in which the base station device 600 continues to perform searching when the CSG cell is not detected after receiving the gap request according to the third embodiment of the present invention.

The process shown in FIG. 27 is effective when the CSG cell is powered on again. In FIG. 27, respective processes and most messages are the same as those in FIG. 24.

First, the mobile station device 500 detects that its own terminal is located in a CSG cell in which the terminal has been registered (step S901).

The mobile station device 500 having detected that its own terminal is in the CSG cell area and not requiring a gap for CSG cell measurement initiates the CSG cell measurement at arbitrary timing (step S902).

Here, when the CSG cell measurement result is no detection of an SCH or indicates that only low-level reception quality is obtained, and the same measurement result is continued for a predetermined time or a predetermined number of times, the mobile station device 500 generates a CSG cell search request message. The mobile station device 500 includes at least one corresponding CSG cell information in the CSG cell search request message and transmits the CSG cell search request message to the base station device 600 of the source cell (step S903).

When the base station device 600 of the source cell receives the CSG cell search request message, the base station device 600 searches for the designated CSG cell to determine whether the CSG cell is deployed as a neighboring cell of the source cell or not (step S904).

Here, the neighboring cell includes a cell using a different frequency or communication system from the source cell. The CSG cell may be searched from the neighboring cell information stored in the base station device 600 or the base station device 600 may ask neighboring base station devices 600 about the presence of the cell.

Next, the base station device 600 of the source cell transmits a measurement control message including a series of information (search result information) such as the CSG cell search result and the reasons of no detection to the mobile station device 500 (step S905).

When the CSG cell is not detected, the base station device 600 of the source cell continues to search for the CSG cell in a period of time T2 (step S906).

When the CSG cell is detected, the base station device 600 of the source cell transmits a measurement control message including the search result information based on the update information of the CSG cell and the CSG cell search result information to the mobile station device 500, if necessary (step S907). The mobile station device 500 having received the measurement control message determines subsequent CSG cell measurement control according to the content of the measurement control message.

Here, when the CSG cell has not been detected as a result of executing the CSG cell search, the base station device 600 of the source cell activates a timer to count a predetermined time T2 (step S904). The time T2 may be a fixed value or may be changed in consideration of reasons of no CSG cell detection or traffic.

The base station device 600 searches for the CSG cell notified of from the mobile station device 500 again after the time T2 expires (step S906). FIG. 27 shows the case where the CSG cell is detected in the CSG cell search of step S906. However, when the CSG cell is not detected, a timer is activated again and the same process is iteratively performed.

When the timer is activated again, the expiration time of the timer may differ from T2. For example, the expiration time may be extended by a predetermined time according to the detection execution number or the time T2 may be increased n times (e.g., n=2, 3, . . . ) according to the detection execution number. When the CSG cell is detected or the mobile station device 500 moves to a cell other than the source cell, the base station device 600 stops the timer, and when the expiration time of the timer is changed, the timer returns to a predetermined initial value. When the CSG cell is not detected after a predetermined time has elapsed, the base station device 600 stops the timer or switches the timer to a low frequency such as once every few hours and then continues to search for the CSG cell.

Since the mobile station device 500 is notified of the search result information at a time when the CSG cell measurement can be performed through the process shown in FIG. 27, useless measurement can be suppressed and more optimal measurement control can be executed.

In the present embodiment, any one of the data structures shown in FIGS. 11A, 11B, and 12 may be used as a data structure of the CSG cell search request message transmitted by the mobile station device 500.

The data structure may differ from the data structures in FIGS. 11A, 11B and 12 as long as the data structure allows the base station device 600 to determine that the request is a CSG cell search request and thus can include required CSG cell information.

According to the present embodiment, when the CSG cell is not detected despite a determination that the terminal has entered the area of the CSG cell in which the terminal has been registered, the mobile station device 500 can notify the base station device 600 of the information on the CSG cell in which the terminal has been registered.

The base station device 600 can determine whether the CSG cell of the mobile station device 500 is deployed in the neighboring area or not and notify the mobile station device 500 of the result.

Further, the update information of the CSG cell of the mobile station device 500 can be included.

When the CSG cell is not detected, the reasons of no detection may be notified of. The mobile station device 500 can properly perform subsequent measurement control using this information.

According to the present embodiment, even when the gap is unnecessary, the mobile station device 500 can transmit the information for measuring the CSG cell in which its own terminal has been registered, to the base station device 600. The base station device 600 confirms whether the notified CSG cell is deployed as a neighboring cell or not, thus suppressing unnecessary measurement due to an error of the detection of the CSG cell area in the mobile station device 500 and reducing power consumption in the mobile station device 500.

The base station device 600 can include the search result information (e.g., update information and reasons of no detection) for the CSG cell of the mobile station device 500 in the measurement control message. The mobile station device 500 updates the information on the CSG cell in which the terminal has been registered in consideration of the search result information, thus improving accuracy of subsequent CSG cell detection and measurement efficiency.

In the above-described embodiments, programs of realizing the functions of the respective units of the transmission devices (FIGS. 2 and 21) and the reception devices (FIGS. 1B, 13 and 20) in the mobile station device 500 or all or some of the respective units of the transmission devices (FIGS. 4, 14, and 23) and the reception devices (FIGS. 3 and 22) in the base station device 600 may be recorded on a computer-readable recording medium. The programs recorded on the recording medium may be read and executed by the computer system to control the mobile station device or the base station device. The "computer system" mentioned herein includes an operating system (OS) or hardware such as peripheral devices.

The "computer-readable recording medium" includes a storage device, including a portable medium such as a flexible disk, a magnetic optical disk, a ROM, and a CD-ROM, and a hard disk embedded in the computer system. Further, the "computer-readable recording medium" may include a medium for temporarily and dynamically storing programs, like a communication line when a program is transmitted via a network such as the Internet or a communication line such as a telephone line, and a medium for storing programs for a predetermined time, like a volatile memory inside a computer system including a server and a client in that case. The program may be a program for realizing some of the above-described functions. Alternatively, the program may be a program capable of realizing the above-described functions through a combination with a program previously stored in a computer system.

While the embodiments of the present invention have been described in detail with reference to the drawings, specific configurations are not limited to the embodiments and may include any design in the scope without departing from the subject matter of the present invention.

INDUSTRIAL APPLICABILITY

The present invention is applicable to a mobile communication system, a base station device, a mobile station device, and a mobile communication method capable of improving detection accuracy for a small base station device, reducing power consumption, and improving use efficiency of radio resources.

The invention claimed is:

1. A mobile communication system comprising:
a mobile station device;
a first base station device configured to communicate with the mobile station device; and
a second base station device which is registered in the mobile station device to access the second base station device, wherein
the mobile station device is further configured to:
    detect that the mobile station device enters an area of a cell of the second base station device,
    transmit, to the first base station device, information of the cell of the second base station device includes a frequency of the second base station device, based on a list of the cell of the second base station device previously stored in the mobile station device in the case where both 1) the mobile station device detects that the mobile station device enters the area of the cell of the second base station device and 2) the mobile station device is not able to detect the cell of the second base station device, and
the first base station device is further configured to perform searching for a presence of the cell of the second base station device based on the information of the cell of the second base station device to update control information required for the mobile station device to perform a measurement associated with the cell of the second base station device, wherein the information of the cell of the second base station device is at least used by the first base station device for searching for the presence of the cell of the second base station device and determining whether a gap is needed for the measurement.

2. The mobile communication system according to claim 1, wherein the mobile station device is configured to update the control information, and performs the measurement associated with the cell of the second base station device based on the updated control information.

3. The mobile communication system according to claim 1, wherein the cell of the second base station device is a CSG cell.

4. A mobile station device that is configured to communicate with a first base station device and where a second base station device is registered in the mobile station device to access the second base station device, the mobile station device comprising:
a detection unit configured to detect that the mobile station device enters an area of a cell of the second base station device;
a transmission unit configured to transmit, to the first base station device, information of the cell of the second base station device includes a frequency of the second base station device, based on a list of the cell of the second base station device previously stored in the mobile station device in the case where both 1) the detection unit of the mobile station device detects that the mobile station device enters the area of the cell of the second base station device and 2) the mobile station device is not able to detect the cell of the second base station device; and a measurement unit configured to perform a measurement associated with the cell of the second base station device based on control information required for the mobile station device to perform the measurement, wherein the information is used for searching for a presence of the cell of the second base station device and determining whether a gap is needed for the measurement by the first base station, and the control information being updated by the first base station device and including a gap information in case where the gap is needed for the measurement by using the received information.

5. A base station device that is configured to communicate with a mobile station device, the base station device comprising:

a reception unit configured to receive information of a cell of another base station device includes a frequency of the second base station device, registered in the mobile station device to access the another base station device from the mobile station device, in the case where both 1) it is detected by the mobile station device that the mobile station device enters an area of the cell of the another base station device and 2) the mobile station device is not able to detect the cell of the second base station device; and an updating unit configured to update control information required for the mobile station device to perform a measurement associated with the cell of the another base station device, wherein the information of the cell of the second base station device is at least used by the base station device for searching for a presence of the cell of the second base station device based on the information of the cell of the second base station device and determining whether a gap is needed for the measurement.

6. A mobile communication method performed by a mobile station device, wherein a first base station device is configured to communicate with the mobile station device and a second base station device is registered in the mobile station device to access the second base station device, the mobile communication method comprising:

detecting that the mobile station device enters an area of a cell of the second base station device;

transmitting, to the first base station device, information of the cell of the second base station device includes a frequency of the second base station device, based on a list of the cell of the cell of the second base station device previously stored in the mobile station device in the case where both 1) the mobile station device detects that the mobile station device enters the area of the second base station device and 2) the mobile station device is not able to detect the cell of the second base station device; and updating control information required for the mobile station device to perform a measurement associated with the cell of the second base station device, wherein the information of the cell of the second base station device is at least used by the first base station device for searching for a presence of the cell of the second base station device based on the information of the cell of the second base station device and determining whether a gap is needed for the measurement.

* * * * *